US012768496B2

(12) United States Patent
Hayashi

(10) Patent No.: US 12,768,496 B2
(45) Date of Patent: Oct. 20, 2026

(54) ELECTRIC-POWERED LUBRICATOR, AND METHOD FOR DISPENSING LUBRICANT FROM ELECTRIC-POWERED LUBRICATOR

(71) Applicant: MAKITA CORPORATION, Anjo (JP)

(72) Inventor: Yuki Hayashi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 177 days.

(21) Appl. No.: 18/751,640

(22) Filed: Jun. 24, 2024

(65) Prior Publication Data

US 2025/0012401 A1 Jan. 9, 2025

(30) Foreign Application Priority Data

Jul. 5, 2023 (JP) ................................ 2023-110627

(51) Int. Cl.

| | |
|---|---|
| ***F16N 3/12*** | (2006.01) |
| ***F16N 7/26*** | (2006.01) |
| ***F16N 7/38*** | (2006.01) |
| ***F16N 11/08*** | (2006.01) |
| ***F16N 13/06*** | (2006.01) |
| ***F16N 29/02*** | (2006.01) |

(52) U.S. Cl.

CPC ................. *F16N 3/12* (2013.01); *F16N 7/26* (2013.01); *F16N 7/38* (2013.01); *F16N 11/08* (2013.01); *F16N 29/02* (2013.01); *F16N 2013/063* (2013.01); *F16N 2230/18* (2013.01); *F16N 2250/16* (2013.01)

(58) Field of Classification Search

CPC .. F16N 3/12; F16N 2013/063; F16N 2230/18; F16N 2250/16; F16N 11/08; F16N 7/38; F16N 7/26; F16N 29/02

See application file for complete search history.

(56) References Cited

U.S. PATENT DOCUMENTS

| | | | | |
|---|---|---|---|---|
| 8,528,782 | B2 | 9/2013 | Mergener et al. | |
| 8,915,331 | B2 | 12/2014 | Alekseyev et al. | |
| 10,914,422 | B2 * | 2/2021 | Kawai | F16N 13/02 |
| 12,404,971 | B2 * | 9/2025 | Chen | F16N 3/12 |
| 2004/0226969 | A1 * | 11/2004 | Shew | G01F 11/029 222/256 |
| 2007/0137942 | A1 * | 6/2007 | Weems | F16N 5/02 184/105.2 |

(Continued)

FOREIGN PATENT DOCUMENTS

| | | | | | |
|---|---|---|---|---|---|
| CN | 2752589 | Y * | 1/2006 | F16N 3/12 |
| CN | 110953472 | A * | 4/2020 | F16N 13/06 |

(Continued)

*Primary Examiner* — Frederick C Nicolas

(74) *Attorney, Agent, or Firm* — Oliff PLC

(57) ABSTRACT

One aspect of the present disclosure provides an electric-powered lubricator including a first manual switch, an electric motor, a drive circuit, a pump, and a control circuit. The control circuit controls, while the electric motor is being driven, the drive circuit such that the electric motor decelerates from a preset rotational speed in accordance with a difference between (i) a setting value and (ii) a calculated value. The setting value corresponds to a desired count of reciprocation of a plunger in the pump. The calculated value corresponds to a calculated count of reciprocation of the plunger.

12 Claims, 22 Drawing Sheets

(56) References Cited

U.S. PATENT DOCUMENTS

| | | | | |
|---|---|---|---|---|
| 2015/0176762 | A1* | 6/2015 | Conley | F16N 29/02 184/26 |
| 2018/0340652 | A1* | 11/2018 | Kawai | F16N 3/12 |
| 2020/0266738 | A1* | 8/2020 | Koeppel | F16N 13/06 |
| 2024/0318776 | A1* | 9/2024 | Hayashi | F16N 13/06 |

FOREIGN PATENT DOCUMENTS

| | | | | |
|---|---|---|---|---|
| CN | 111947004 | A | * 11/2020 | F16N 3/12 |
| CN | 219841374 | U | * 10/2023 | F16N 3/12 |
| CN | 117588675 | A | * 2/2024 | F16N 7/38 |

* cited by examiner

ELECTRIC-POWERED LUBRICATOR, AND METHOD FOR DISPENSING LUBRICANT FROM ELECTRIC-POWERED LUBRICATOR

CROSS-REFERENCE TO RELATED APPLICATIONS

The present application claims the benefit of Japanese Patent Application No. 2023-110627 filed with the Japan Patent Office on Jul. 5, 2023, the entire disclosure of which is incorporated herein by reference.

BACKGROUND

The present disclosure relates to an electric-powered lubricator. U.S. Pat. No. 8,528,782 B2 discloses a grease gun including a lubricant measurement system. The lubricant measurement system counts the number of strokes of a pump of the grease gun during operation of the grease gun. When the number of strokes counted reaches a preset count, the lubricant measurement system stops a motor of the grease gun. The preset count corresponds to a desired amount of lubricant to be dispensed.

SUMMARY

In the grease gun described above, when the motor is rotated at a high speed in order to efficiently dispense the lubricant, it can be difficult to promptly stop the motor. As a result, excess lubricant can be dispensed from the grease gun during the interval from when the lubricant measurement system starts stopping the motor until when the motor actually stops.

It is desirable in one aspect of the present disclosure to be able to provide a technique capable of reducing the time required to dispense a desired amount of lubricant from an electric-powered lubricator while suppressing excess lubricant from being dispensed from the electric-powered lubricator.

In the present disclosure, the terms such as "first", "second", and the like merely intend to distinguish elements from one another, but do not intend to limit the order or the number of the elements. Accordingly, a first element may be referred to as a second element, and similarly, a second element may be referred to as a first element. In addition, a first element may be included without a second element, or similarly, a second element may be included without a first element.

One aspect of the present disclosure provides an electric-powered lubricator including a first manual switch, an electric motor, a drive circuit, a pump, and a control circuit.

The first manual switch is configured to be manually operated by a user of the electric-powered lubricator. The electric motor is configured to generate a driving force. The drive circuit is configured to drive the electric motor. The pump includes a dispensing port, a chamber, and a plunger. The dispensing port communicates with the chamber. The chamber is configured to accommodate a lubricant therein. The plunger is (i) within the chamber and (ii) configured to reciprocate within the chamber by the driving force of the electric motor so as to dispense the lubricant within the chamber from the dispensing port.

The control circuit is configured to perform:

a first operation to control the drive circuit so as to rotate the electric motor at a preset rotational speed in response to the first manual switch being manually operated;

a second operation to calculate a count of reciprocation of the plunger while the electric motor is being driven;

a third operation to control, while the electric motor is being driven, the drive circuit such that the electric motor decelerates from the preset rotational speed in accordance with a difference between (i) a setting value and (ii) a calculated value, the setting value corresponding to a desired count of reciprocation of the plunger, the calculated value corresponding to a calculated count of reciprocation of the plunger; and a fourth operation to control the drive circuit so as to stop driving of the electric motor in response to the calculated value having reached the setting value.

In the electric-powered lubricator configured as described above, when the first manual switch is manually operated, the electric motor is driven at the preset rotational speed. If the preset rotational speed is set such that a desired amount of lubricant can be quickly dispensed, the time required to dispense the desired amount of lubricant can be reduced. The electric motor is then decelerated in accordance with the difference between the setting value and the calculated value. Therefore, when the calculated value reaches the setting value and the driving of the electric motor is stopped, the actual rotational speed of the electric motor falls below the preset rotational speed. As a result, the time required for the rotation of the electric motor to stop is reduced, and excess lubricant is suppressed from being dispensed from the electric-powered lubricator.

Another aspect of the present disclosure provides a method for dispensing (or discharging) a lubricant from an electric-powered lubricator, the method including:

driving an electric motor of the electric-powered lubricator at a preset rotational speed based on a manual switch of the electric-powered lubricator being manually operated, the electric motor being configured to reciprocate a plunger of the electric-powered lubricator;

calculating a count of reciprocation of the plunger;

controlling the electric motor such that the electric motor decelerates from the preset rotational speed in accordance with a difference between (i) a setting value and (ii) a calculated value, the setting value corresponding to a desired count of reciprocation of the plunger, the calculated value corresponding to a calculated count of reciprocation of the plunger; and stopping driving of the electric motor based on the calculated value having reached the setting value.

According to such a method, it is possible to reduce the time required to dispense a desired amount of lubricant from the electric-powered lubricator while suppressing excess lubricant from being dispensed from the electric-powered lubricator.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Overview of Embodiments

Figure 1:
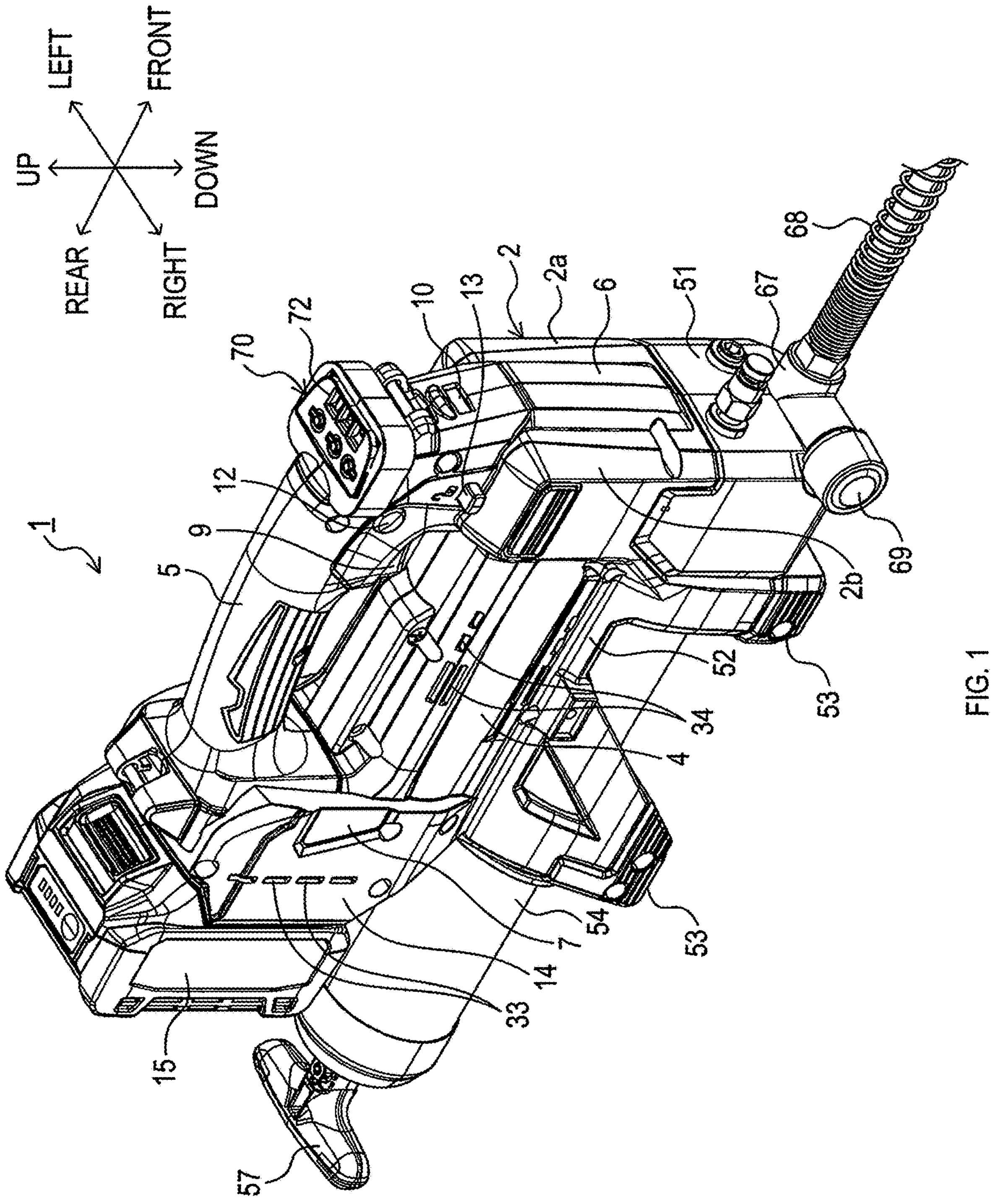
FIG. 1 is a perspective view of an electric-powered lubricator in a first embodiment.

One embodiment may provide an electric-powered lubricator (or an electric-powered oil syringe or an electric-powered grease gun) including at least any one of:

- Feature 1: a first manual switch configured to be manually operated by a user of the electric-powered lubricator;
- Feature 2: an electric motor configured to generate a driving force;
- Feature 3: a drive circuit configured to drive the electric motor;
- Feature 4: a pump including a dispensing port, a chamber, and a plunger;
- Feature 5: the dispensing port communicates with the chamber;
- Feature 6: the chamber is configured to accommodate a lubricant therein;
- Feature 7: the plunger is (i) within the chamber and (ii) configured to reciprocate within the chamber by the driving force of the electric motor so as to dispense (or discharge) the lubricant within the chamber from the dispensing port;
- Feature 8: a control circuit;
- Feature 9: the control circuit is configured (or programmed) to perform a first operation to control the drive circuit so as to rotate the electric motor at a preset rotational speed in response to the first manual switch being manually operated;
- Feature 10: the control circuit is configured (or programmed) to perform a second operation to calculate a count of reciprocation of the plunger while the electric motor is being driven;
- Feature 11: the control circuit is configured (or programmed) to perform a third operation to control, while the electric motor is being driven, the drive circuit such that the electric motor decelerates from the preset rotational speed in accordance with a difference (or a deviation or an error) between (i) a setting value and (ii) a calculated value;
- Feature 12: the setting value corresponds to a desired count (or a target count) of reciprocation of the plunger;
- Feature 13: the calculated value corresponds to a calculated count of reciprocation of the plunger; and
- Feature 14: the control circuit is configured (or programmed) to perform a fourth operation to control the drive circuit so as to stop driving of the electric motor in response to the calculated value having reached the setting value.

In the electric-powered lubricator including at least Features 1 through 14, when the first manual switch is manually operated, the electric motor is driven at the preset rotational speed. If the preset rotational speed is set such that a desired amount (or a target amount) of lubricant can be quickly dispensed, the time required to dispense the desired amount of lubricant can be reduced. The electric motor is then decelerated in accordance with the difference between the setting value and the calculated value. Therefore, when the calculated value reaches the setting value and the driving of the electric motor is stopped, the actual rotational speed of the electric motor falls below the preset rotational speed. As a result, the time required for the rotation of the electric motor to stop is reduced, and excess lubricant is suppressed from being dispensed from the electric-powered lubricator.

One embodiment may include, in addition to or in place of at least any one of Features 1 through 14,

- Feature 15: the control circuit is configured (or programmed) to control the drive circuit such that an actual rotational speed of the electric motor decreases in accordance with a decrease in the difference, in the third operation.

In the electric-powered lubricator including at least Features 1 through 15, the actual rotational speed of the electric motor can be reduced sufficiently when the calculated value reaches the setting value, and the electric motor can stop more quickly. Therefore, even when the preset rotational speed is set to be higher, it is still possible to suppress excess lubricant from being dispensed from the electric-powered lubricator. As a result, the desired amount of lubricant can be dispensed with higher efficiency.

One embodiment may include, in addition to or in place of at least any one of Features 1 through 15,

- Feature 16: the control circuit is configured (or programmed) to control the drive circuit such that the electric motor decelerates in a continuous manner or a stepwise manner, in the third operation.

In the electric-powered lubricator including at least Features 1 through 14 and 16, the electric motor can decelerate from the preset rotational speed in the continuous manner or the stepwise manner.

One embodiment may include, in addition to or in place of at least any one of Features 1 through 16, at least any one of:

Feature 17: the control circuit is configured (or programmed) to calculate a count of rotations of the electric motor in the second operation;

Feature 18: the calculated value indicates the count of rotations calculated; and Feature 19: the control circuit is configured (or programmed) to convert the setting value into a desired count (or a target count) of rotations of the electric motor and control the drive circuit such that the electric motor decelerates from the preset rotational speed in accordance with the difference between (i) the setting value converted and (ii) the calculated value, in the third operation.

In the electric-powered lubricator including at least Features 1 through 14 and 17 through 19, the time required to dispense the desired amount of lubricant can be reduced and excess lubricant can be suppressed from being dispensed from the electric-powered lubricator, based on the count of rotations of the electric motor.

One embodiment may include, in addition to or in place of at least any one of Features 1 through 19, at least any one of:

Feature 20: the control circuit is configured (or programmed) to perform a fifth operation to control the drive circuit so as to stop driving of the electric motor in response to the first manual switch being released from a manual operation performed by the user; and Feature 21: the control circuit is configured (or programmed) to perform a sixth operation to initialize or hold the calculated value in response to the first manual switch being released from the manual operation.

In the electric-powered lubricator including at least Features 1 through 14, 20, and 21, when the first manual switch is released from the manual operation performed by the user, driving of the electric motor is stopped and the calculated value is initialized or held.

In a case where the calculated value is initialized, when the first manual switch is manually operated again, the electric motor is driven again at the preset rotational speed.

In a case where the calculated value is held, when the first manual switch is manually operated again, the electric motor is driven again at a rotational speed corresponding to the difference between the setting value and the calculated value that is held.

One embodiment may include, in addition to or in place of at least any one of Features 1 through 21, Feature 22: the control circuit is configured (or programmed) to control the drive circuit so as to apply a braking force to the electric motor in the fourth operation.

In the electric-powered lubricator including at least Features 1 through 14 and 22, the electric motor can be immediately stopped when the calculated value reaches the setting value, and thus excess lubricant can be more reliably suppressed from being dispensed.

One embodiment may include, in addition to or in place of at least any one of Features 1 through 22, at least any one of:

Feature 23: the control circuit is configured (or programmed) to output, to the drive circuit, a pulse width modulated signal to control the drive circuit; and Feature 24: the drive circuit is configured to drive the electric motor in accordance with the pulse width modulated signal.

In the electric-powered lubricator including at least Features 1 through 14, 23, and 24, the electric motor can be controlled with the pulse width modulated signal.

One embodiment may include, in addition to or in place of at least any one of Features 1 through 24, at least any one of:

Feature 25: at least one second manual switch (i) distinct from the first manual switch and (ii) configured to be manually operated by the user; and Feature 26: the control circuit is configured (or programmed) to perform a seventh operation to vary the setting value based on the at least one second manual switch being manually operated.

In the electric-powered lubricator including at least Features 1 through 14, 25, and 26, the user can vary the setting value with the at least one second manual switch.

One embodiment may include, in addition to or in place of at least any one of Features 1 through 26, at least any one of:

Feature 27: the electric motor has its rated rotational speed; and

Feature 28: the preset rotational speed is the rated rotational speed.

In the electric-powered lubricator including at least Features 1 through 14, 27, and 28, the desired amount of lubricant can be dispensed most quickly.

One embodiment may include, in addition to or in place of at least any one of Features 1 through 28, at least any one of:

Feature 29: the lubricant is in semisolid form; and

Feature 30: the lubricant includes grease.

In one embodiment, the lubricant may be in liquid or solid form.

In one embodiment, the control circuit may be integrated into a single electronic unit or into a single electronic device or into a single circuit board.

In one embodiment, the control circuit may be a combination of (i) two or more electronic circuits, (ii) two or more electronic units, or (iii) two or more electronic devices, each of which is separately disposed on or within the electric-powered lubricator.

In one embodiment, the control circuit may include a microcomputer (or a microcontroller or a microprocessor), a wired logic, an application specific integrated circuit (ASIC), an application specific general product (ASSP), a programmable logic device (such as a field programmable gate array (FPGA)), a discrete electronic component, and/or a combination of the foregoing.

Examples of the first manual switch include a trigger switch, a push-button switch, a dial switch, a sliding switch, a tactile switch, a joystick, a touch panel, a touch screen, and a graphical user interface (GUI).

One embodiment may provide a method including at least any one of:

Feature 31: driving an electric motor of an electric-powered lubricator at a preset rotational speed based on a manual switch of the electric-powered lubricator being manually operated;

Feature 32: the electric motor is configured to reciprocate a plunger of the electric-powered lubricator;

Feature 33: calculating a count of reciprocation of the plunger;

Feature 34: controlling the electric motor such that the electric motor decelerates from the preset rotational speed in accordance with a difference (or a deviation or an error) between (i) a setting value and (ii) a calculated value;

Feature 35: the setting value corresponds to a desired count (or a target count) of reciprocation of the plunger;

Feature 36: the calculated value corresponds to a calculated count of reciprocation of the plunger; and Feature 37: stopping driving of the electric motor based on the calculated value having reached the setting value.

With the method including at least Features 31 through 37, it is possible to reduce the time required to dispense a desired amount (or a target amount) of lubricant from the electric-powered lubricator while suppressing excess lubricant from being dispensed from the electric-powered lubricator.

In one embodiment, the electric-powered lubricator may be a battery-powered lubricator.

In one embodiment, Features 1 through 37 may be combined in any combinations.

In one embodiment, any of Features 1 through 37 may be excluded.

2. Specific Example Embodiments

The following example embodiments provide an electric-powered lubricator 1 shown in FIG. 1. The electric-powered lubricator 1 is an electric-powered grease gun configured to dispense semisolid lubricant, more specifically, grease.

2-1. First Embodiment

2-1-1. Mechanical Configuration of Electric-Powered Lubricator

Figure 2:
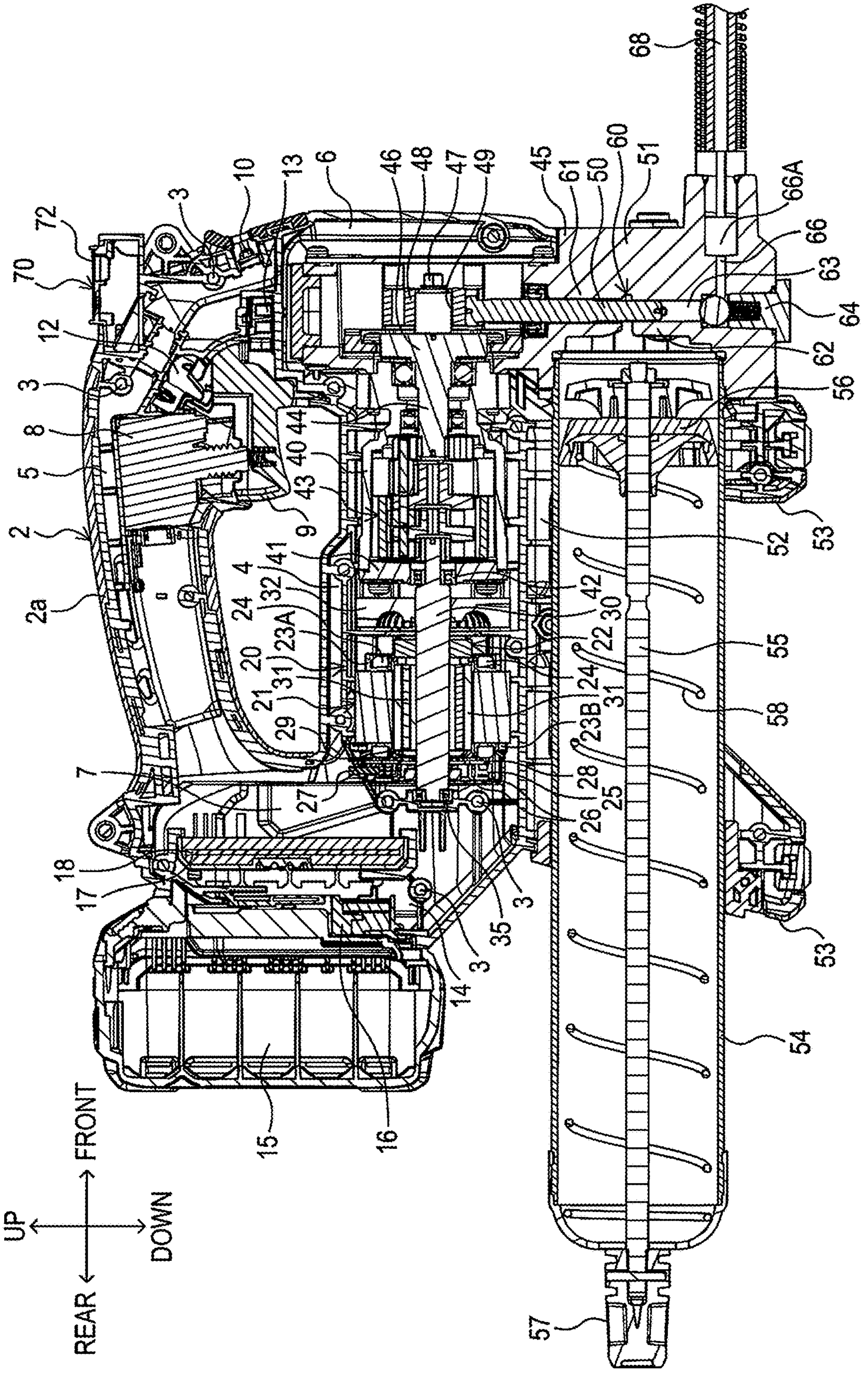
FIG. 2 is a central longitudinal sectional view of the electric-powered lubricator.

As shown in FIGS. 1 and 2, the electric-powered lubricator 1 includes a housing 2. The housing 2 includes a first half housing 2*a* and a second half housing 2*b* joined together by two or more screws 3. The housing 2 includes a motor container 4 at a central portion in its height direction. The height direction corresponds to a direction from the bottom to the top or from the top to the bottom of the housing 2. In the first embodiment, the motor container 4 has a cylindrical shape and extends in a length direction. The length direction corresponds to a direction from the front to the rear or from the rear to the front of the housing 2. The housing 2 includes a grip 5 on its top. In the first embodiment, the grip 5 extends in the length direction and is bent downward. The motor container 4 includes a front joint portion 6 at its front end. The front joint portion 6 is joined to the front end of the grip 5. The motor container 4 includes a rear joint portion 7 at its rear end. The rear joint portion 7 is joined to the rear end of the grip 5. In the first embodiment, the rear joint portion 7 stands upward so as to form a space between the motor container 4 and the grip 5.

The electric-powered lubricator 1 includes a trigger switch 8 accommodated in the grip 5. The electric-powered lubricator 1 includes a trigger 9 for a user of the electric-powered lubricator 1 to manually operate the trigger switch 8. The trigger 9 is pulled by the user to dispense grease. In the first embodiment, the trigger 9 protrudes downward from the grip 5.

The grip 5 includes a light 10 at its front. In the first embodiment, the light 10 includes a not shown light emitting diode (LED) as a light source. The grip 5 includes an operation panel 70 on its front upper surface. The operation panel 70 is configured to be manually operated by the user (i) to turn on or off the light 10 and (ii) to change settings of the electric-powered lubricator 1.

The grip 5 includes a first lock button 12 at the front of the trigger 9. The first lock button 12 is configured to be depressed by the user to lock the trigger 9 in the fully pulled position. The grip 5 includes a second lock button 13 below the first lock button 12. The second lock button 13 is configured to be depressed by the user to lock the trigger 9 in its original position (that is, non-pulled position).

The rear joint portion 7 includes a battery holder 14 at its rear end. The battery holder 14 is configured such that the battery pack 15 is detachably attached to the battery holder 14. In the first embodiment, the battery holder 14 is configured such that the battery pack 15 is attached to the battery holder 14 by sliding the battery pack 15 from the top to the bottom at the rear end of the battery holder 14. In the first embodiment, the battery pack 15 has a rated voltage of 36 volts. The battery holder 14 includes a terminal block 16 inside. The terminal block 16 is configured to be electrically coupled to the battery pack 15 attached to the battery holder 14. In the first embodiment, the terminal block 16 extends in the height direction.

The battery holder 14 accommodates a control unit 17 at the front of the terminal block 16. In the first embodiment, the control unit 17 extends in the height direction. The control unit 17 includes a control circuit board 18.

The motor container 4 accommodates an electric motor 20. In the first embodiment, the electric motor 20 is an inner rotor type three-phase brushless DC motor. In another embodiments, the electric motor 20 may be any other type of electric motor (for example, a brushed DC motor).

The electric motor 20 includes a stator 21. The stator 21 includes three lead wires 27 (FIG. 2 shows only one of the lead wires 27). The stator 21 includes a first insulator 23A at its front end. The stator 21 includes a second insulator 23B at its rear end. The stator 21 includes three coils (that is, a U-phase coil, a V-phase coil, and a W-phase coil) 24 wound via the first insulator 23A and the second insulator 23B. The second insulator 23B includes not shown six terminals fused to respective ends of wires in these coils 24.

The second insulator 23B includes a short-circuit member 25. The short-circuit member 25 includes three insert-molded short-circuit fittings 26 (FIG. 2 shows only two of the short-circuit fittings 26). These short-circuit fittings 26 electrically couple between the aforementioned terminals of the second insulator 23B such that the aforementioned coils 24 form a delta configuration (or a delta connection).

The stator 21 includes a sensor circuit board 28 between the second insulator 23B and the short-circuit member 25. The sensor circuit board 28 includes first through third rotational position sensors 28A through 28C (see FIG. 5). In the first embodiment, the first through third rotational position sensors 28A through 28C are Hall sensors, but are not limited to Hall sensors. The first through third rotational position sensors 28A through 28C are coupled to three signal lines 29 (FIG. 2 shows only one of the signal lines 29). The lead wires 27 and the signal lines 29 are brought out to the battery holder 14 and coupled to the control circuit board 18 of the control unit 17.

The electric motor 20 includes a rotor 22 inside the stator 21. The rotor 22 includes a rotation shaft 30 at its center. The rotation shaft 30 includes two or more permanent magnets 31 embedded in an outer peripheral wall of the rotation shaft 30. The first through third rotational position sensors 28A through 28C (i) are arranged around the rotor 22 and (ii) detect a rotational position of the rotation shaft 30, and also a rotational position of the rotor 22. The rotation shaft 30 includes a fan 32 at its front end. In the first embodiment, the fan 32 extends perpendicular to the rotation shaft 30.

The rear joint portion 7 includes two or more intake ports 33 on each of its left and right side surfaces. Each of the intake ports 33 sucks air into the motor container 4 from its outside in accordance with rotation of the fan 32. The motor container 4 includes two or more exhaust ports 34 on each of its left and right side surfaces. Each of the exhaust ports 34 is positioned radially outside and at the front of the fan 32, and discharges the air sucked into the motor container 4 to the outside of the motor container 4.

The rear joint portion 7 accommodates a first bearing 35 at the rear of the short-circuit member 25. The first bearing 35 rotatably supports the rear end of the rotation shaft 30.

The motor container 4 includes a gear housing 40 at the front of the electric motor 20. In the first embodiment, the gear housing 40 has a cylindrical shape. The gear housing 40 has an opening at its rear end. The gear housing 40 includes a bracket plate 41 attached to this opening. The rotation shaft 30 penetrates the bracket plate 41 and protrudes into the gear housing 40. The bracket plate 41 holds a second bearing 42. The second bearing 42 rotatably supports the front end of the rotation shaft 30.

The gear housing 40 includes a spindle 44 at its front end. The gear housing 40 accommodates a deceleration mechanism 43. The deceleration mechanism 43 is configured (i) to receive rotation of the rotation shaft 30 and (ii) to rotate the spindle 44 at a rotational speed lower than a rotational speed of the rotation shaft 30. The deceleration mechanism 43 may include a planetary gear.

The housing 2 includes a crank housing 45 at the front end of the gear housing 40. In the first embodiment, the crank housing 45 extends in the height direction. The spindle 44 protrudes into the crank housing 45 from the gear housing 40.

The crank housing 45 accommodates a crank board 46 at the front end of the spindle 44. The crank board 46 includes an eccentric pin 47 protruding to the front. The crank housing 45 includes a slider 48 at the front of the crank board 46. The slider 48 has an elongated hole 49 extending in a width direction. The width direction corresponds to a direction from the right to the left or from the left to the right of the housing 2. The slider 48 is supported to be able to move up and down inside the crank housing 45. The eccentric pin 47 is inserted into the elongated hole 49. The slider 48 is coupled to the plunger 50 at the center of its lower end. The plunger 50 includes an upper end coupled to the slider 48 and extends downward.

In the crank housing 45 configured as above, when the crank board 46 rotates together with the spindle 44, the eccentric pin 47 performs eccentric movements. Due to strokes in the height direction of the eccentric pin 47, the slider 48 reciprocates up and down and the plunger 50 also reciprocates up and down.

The crank housing 45 includes a front holder 51 at its lower part. The housing 2 includes a rear holder 52 at the rear of the front holder 51 and at a lower part of the motor container 4. The rear holder 52 includes two legs 53 protruding downward at its front and rear ends.

The electric-powered lubricator 1 includes a tank 54 supported by the front holder 51 and the rear holder 52. The tank 54 has an open front end. The tank 54 reaches to the rear surface of the front holder 51 through the rear holder 52. The front end of the tank 54 is screwed into the rear surface of the front holder 51. In other words, the tank 54 extends in the length direction below the motor container 4.

The tank 54 accommodates a rod 55. The rod 55 extends from the rear end of the tank 54 to the front end of the tank 54. The rod 55 holds a piston 56 in a manner movable along the rod 55. The rod 55 has a rear end protruding from the tank 54. The tank 54 includes a handle 57 attached to the rear end of the rod 55. The tank 54 accommodates a coil spring 58. The coil spring 58 is located at the rear of the piston 56 and biases the piston 56 to the front. The tank 54 accommodates a not shown cartridge filled with grease at the front of the piston 56. When this cartridge is pressed by the piston 56, the grease is delivered into the front holder 51.

The front holder 51 includes a pump 60. The pump 60 includes the aforementioned plunger 50. The pump 60 includes an upper cylindrical portion 61 and a lower cylindrical portion 62. The upper cylindrical portion 61 and the lower cylindrical portion 62 form a chamber 63. The plunger 50 is inside the chamber 63. The chamber 63 communicates with the tank 54. The pump 60 includes a check valve 64 at the lower end of the chamber 63.

The lower cylindrical portion 62 includes a dispensing path 66 that (i) communicates with the chamber 63 and (ii) extends in the length direction. The front holder 51 includes a front cylindrical portion 67 at its front end. The front cylindrical portion 67 protrudes to the front from the front holder 51. The dispensing path 66 passes through the center of the front cylindrical portion 67. The dispensing path 66 has a dispensing port 66A at its front end. The front cylindrical portion 67 is connected to a hose 68. The grease is dispensed from the dispensing port 66A to the outside of the electric-powered lubricator 1 via the hose 68.

The front cylindrical portion 67 includes a relief valve 69 at its right side portion. The relief valve 69 is configured to discharge the grease inside the dispensing path 66 to the outside of the electric-powered lubricator 1 in response to a pressure of the grease inside the dispensing path 66 being greater than or equal to a specified pressure.

2-1-2. Mechanical Operation of Electric-Powered Lubricator

In the electric-powered lubricator 1 configured as above, when the user pulls the trigger 9, the electric motor 20 rotates, and then the rotation shaft 30 rotates.

Rotation of the rotation shaft 30 is transmitted to the spindle 44 via the deceleration mechanism 43, and the crank board 46 rotates together with the spindle 44. This causes the eccentric pin 47 to perform eccentric movements and the slider 48 moves up and down, and the plunger 50 reciprocates up and down.

In the pump 60, when the plunger 50 moves upward, the grease flows into the chamber 63 from the tank 54. When the plunger 50 moves downward, the grease inside the chamber 63 flows into the dispensing path 66, and is dispensed from the dispensing port 66A to the outside of the electric-powered lubricator 1 via the hose 68. This dispensing operation is repeated as the plunger 50 reciprocates.

2-1-3. Detail of Operation Panel

Figure 3:
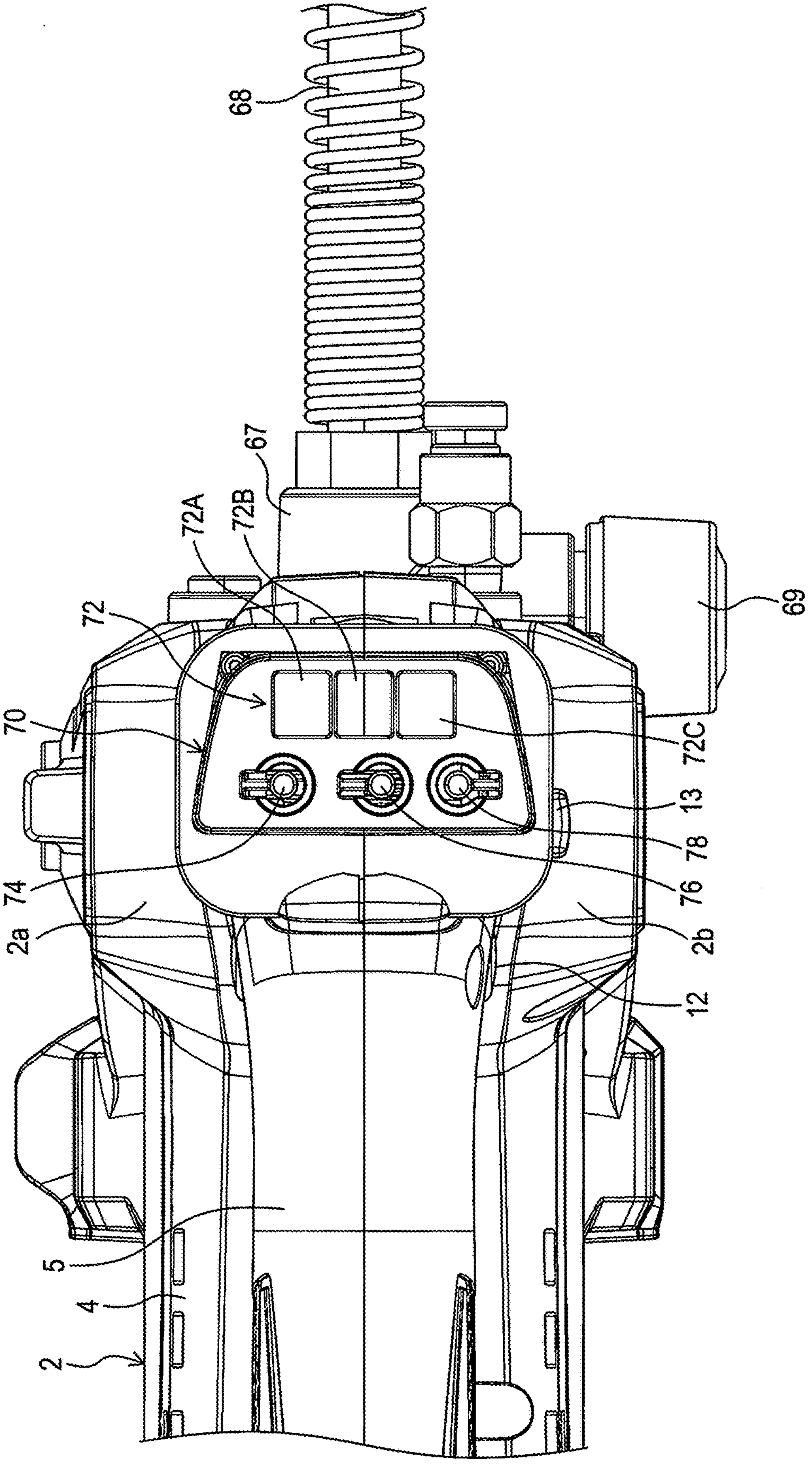
FIG. 3 is a plan view of an operation panel of the electric-powered lubricator.

As shown in FIG. 3, the operation panel 70 includes a display device 72. The display device 72 includes a first display screen 72A, a second display screen 72B, and a third display screen 72C. In the first embodiment, each of the first through third display screens 72A through 72C is a seven-segment display. In another embodiment, each of the first through third display screens 72A through 72C may be any other type of display screen including a liquid crystal display (LCD).

The first through third display screens 72A through 72C are arranged in the width direction on the front upper surface of the operation panel 70. The first through third display screens 72A through 72C are covered with a transparent resin plate.

The operation panel 70 includes a display selection switch 74. In the first embodiment, the display selection switch 74 is a push-button switch. In another embodiment, the display selection switch 74 may be any other type of manual switch. The display selection switch 74 is manually operated (turned on) by the user to select a parameter value to be displayed on the display device 72. When the display selection switch 74 is manually operated, the selected parameter value is displayed on the first through third display screens 72A through 72C.

The operation panel 70 includes an increment switch 76. In the first embodiment, the increment switch 76 is a push-button switch. In another embodiment, the increment switch 76 may be any other type of manual switch. The increment switch 76 is manually operated (turned on) by the user to increase the selected parameter value of the electric-powered lubricator 1. When the increment switch 76 is manually operated, the increased parameter value is displayed on the first through third display screens 72A through 72C.

The operation panel 70 includes a decrement switch 78. In the first embodiment, the decrement switch 78 is a push-button switch. In another embodiment, the decrement switch 78 may be any other type of manual switch. The decrement switch 78 is manually operated (turned on) by the user to decrease the selected parameter value of the electric-powered lubricator 1. When the decrement switch 78 is manually operated, the decreased parameter value is displayed on the first through third display screens 72A through 72C.

The display selection switch 74 is also manually operated to confirm the parameter value that is increased or decreased by the increment switch 76 or the decrement switch 78.

In the first embodiment, the display selection switch 74, the increment switch 76, and the decrement switch 78 are arranged in the width direction at the rear of the first through third display screens 72A through 72C.

2-1-4. Electrical Configuration of Electric-Powered Lubricator

Figure 4:
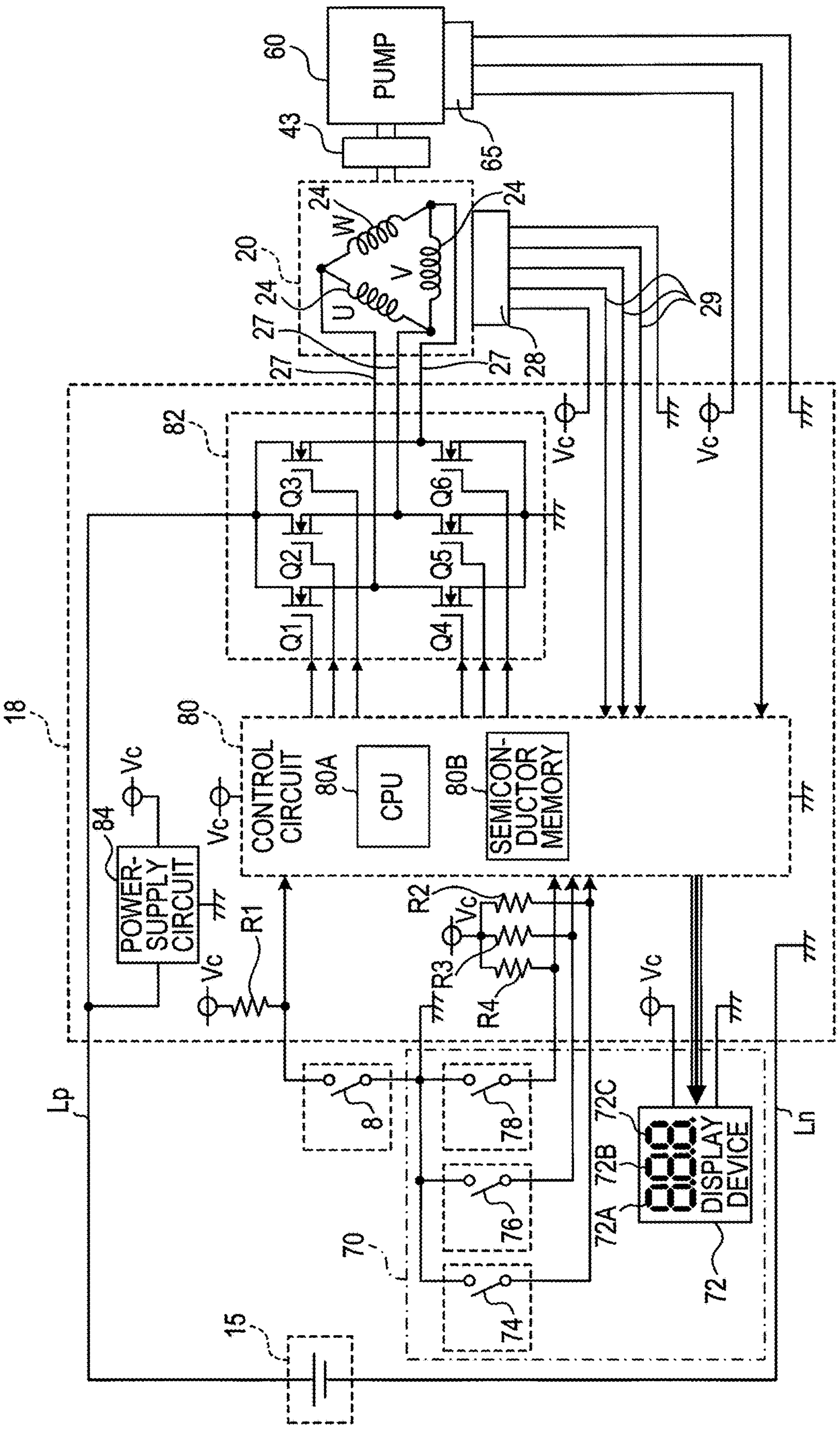
FIG. 4 is a circuit diagram illustrating an electrical configuration of the electric-powered lubricator.

As shown in FIG. 4, the electric-powered lubricator 1 includes a power-supply line Lp that extends from a positive electrode of the battery pack 15 attached to the battery holder 14 onto the control circuit board 18. The electric-powered lubricator 1 includes a ground line Ln that extends from a negative electrode of battery pack 15 attached to the battery holder 14 to the ground on the control circuit board 18. The battery pack 15 applies its rated voltage between the power-supply line Lp and the ground line Ln.

The electric-powered lubricator 1 includes a power-supply circuit 84. In the first embodiment, the power-supply circuit 84 is on the control circuit board 18. The power-supply circuit 84 is (i) coupled to the power-supply line Lp and the ground on the control circuit board 18 and (ii) configured to generate a fixed DC voltage (hereinafter, referred to as a power-supply voltage) Vc based on the rated voltage of the battery pack 15.

The electric-powered lubricator 1 includes a control circuit 80. The control circuit 80 operates with the power-supply voltage Vc. In the first embodiment, the control circuit 80 is on the control circuit board 18. The control circuit 80 is a microcomputer including a CPU 80A, and a semiconductor memory 80B. The semiconductor memory 80B includes a ROM, a RAM, and a rewritable and non-volatile memory. Examples of the rewritable and non-volatile memory include an EEPROM, a flash memory, a ReRAM, and a FeRAM. Various functions of the control circuit 80 are achieved by the CPU 80A executing a program stored in the semiconductor memory 80B. As a result of the CPU 80A executing the program, a method corresponding to this program is performed.

In another embodiment, the control circuit 80 may include an additional microcomputer. In further another embodiment, a part or all of the functions achieved by the CPU 80A may be achieved by one or more electronic components (for example, an integrated circuit). In further another embodiment, the control circuit 80 may be a logic circuit (or a wired logic connection) including two or more electronic components. In further another embodiment, the control circuit 80 may include an ASIC and/or an ASSP. In further another embodiment, the control circuit 80 may include a programmable logic device in which a reconfigurable logic circuit(s) can be built. Examples of the programmable logic device include a FPGA.

The electric-powered lubricator 1 includes a drive circuit 82 configured to drive the electric motor 20. In the first embodiment, the drive circuit 82 is on the control circuit board 18. The drive circuit 82 is a three-phase full-bridge circuit, but is not limited to a three-phase full-bridge circuit. The drive circuit 82 includes first through sixth switches Q1 through Q6. The first through third switches Q1 through Q3 are coupled to the power-supply line Lp on the control circuit board 18 and the aforementioned lead wires 27 of the electric motor 20 so as to serve as high-side switches of the three-phase full-bridge circuit. The fourth through sixth switches Q4 through Q6 are coupled to the lead wires 27 of the electric motor 20 and the ground so as to serve as low-side switches of the three-phase full-bridge circuit.

The first through sixth switches Q1 through Q6 (*i*) respectively receive first through sixth drive control signals from the control circuit 80 and (ii) turn on or off in accordance with the respective drive control signals received. In the first embodiment, the first through sixth drive control signals are pulse width modulated signals. In the first embodiment, the first through sixth switches Q1 through Q6 are semiconductor switches. Examples of the semiconductor switch include a field-effect transistor (FET), a bipolar transistor, and an insulated-gate bipolar transistor (IGBT). In another embodiment, each or at least one of the first through sixth switches Q1 through Q6 may be a mechanical relay.

The control circuit board 18 is coupled to the display device 72 of the operation panel 70. The display device 72 operates with the power-supply voltage Vc received from the control circuit board 18. The display device 72 is configured (i) to receive a display control signal from the control circuit 80 and (ii) to display a parameter value on the first through third display screens 72A through 72C.

The electric-powered lubricator 1 includes first through fourth pull-up resistors R1 through R4. In the first embodiment, the first through fourth pull-up resistors R1 through R4 are on the control circuit board 18. The first through fourth pull-up resistors R1 through R4 include their respective first ends coupled to the power-supply circuit 84 so as to receive the power-supply voltage Vc from the power-supply circuit 84. The first through fourth pull-up resistors R1 through R4 include their respective second ends coupled to respective first contacts of the trigger switch 8, the display selection switch 74, the increment switch 76, and the decrement switch 78. The trigger switch 8, the display selection switch 74, the increment switch 76, and the decrement switch 78 include their respective second contacts coupled to the ground on the control circuit board 18.

When the trigger switch 8, the display selection switch 74, the increment switch 76, and the decrement switch 78 are not manually operated (or are turned off), the second ends of the first through fourth pull-up resistors R1 through R4 have a voltage at the same level (that is, the high level) as the power-supply voltage Vc. When the trigger switch 8, the display selection switch 74, the increment switch 76, and the decrement switch 78 are manually operated (or turned on), the second ends of the first through fourth pull-up resistors R1 through R4 have a voltage of the ground level (that is, the low level). The first through fourth pull-up resistors R1 through R4 may have the identical resistance value. Alternatively, the first through fourth pull-up resistors R1 through R4 may have different resistance values.

The second ends of the first through fourth pull-up resistors R1 through R4 are coupled to the control circuit 80. Therefore, the control circuit 80 can detect whether the trigger switch 8, the display selection switch 74, the increment switch 76, and the decrement switch 78 are manually operated based on the voltages at the second ends of the first through fourth pull-up resistors R1 through R4. Specifically, when the voltages at the second ends of the first through fourth pull-up resistors R1 through R4 are at the high level, the control circuit 80 recognizes that the trigger switch 8, the display selection switch 74, the increment switch 76, and the decrement switch 78 are not manually operated. When the voltages at the second ends of the first through fourth pull-up resistors R1 through R4 are at the low level, the control circuit 80 recognizes that the trigger switch 8, the display selection switch 74, the increment switch 76, and the decrement switch 78 are manually operated.

The sensor circuit board 28 (more specifically, the first through third rotational position sensors 28A through 28C) operates with the power-supply voltage Vc from the control circuit board 18. The first through third rotational position sensors 28A through 28C (i) are coupled to the control circuit 80 via the aforementioned signal lines 29 and (ii) outputs first through third rotation signals to the control circuit 80. The first through third rotation signals are associated with respective three phases (that is, U-phase, V-phase, and W-phase) of the electric motor 20. The first through third rotation signals are sine wave signals, and respective voltages are reversed from positive to negative or negative to positive each time the rotor 22 rotates by 180 electrical degrees. The first through third rotation signals have phase differences of 60 electrical degrees therebetween.

In another embodiment, the sensor circuit board 28 may be configured to output a rotation detection signal (for example, a pulse signal), instead of the first through third rotation signals, to the control circuit 80 each time the rotor 22 rotates by 60 electrical degrees.

The electric-powered lubricator 1 includes a reciprocation detector 65 adjacent to the pump 60 in the crank housing 45. The reciprocation detector 65 operates with the power-supply voltage Vc received from the control circuit board 18. The reciprocation detector 65 (*i*) detects the rotation of the crank board 46 or the position change of the plunger 50 and (ii) outputs a reciprocation detection signal to the control circuit 80 every time the plunger 50 reciprocates. Examples of the reciprocation detector 65 include a Hall sensor and a proximity switch.

2-1-5. Functional Configuration of Control Circuit

Figure 5:
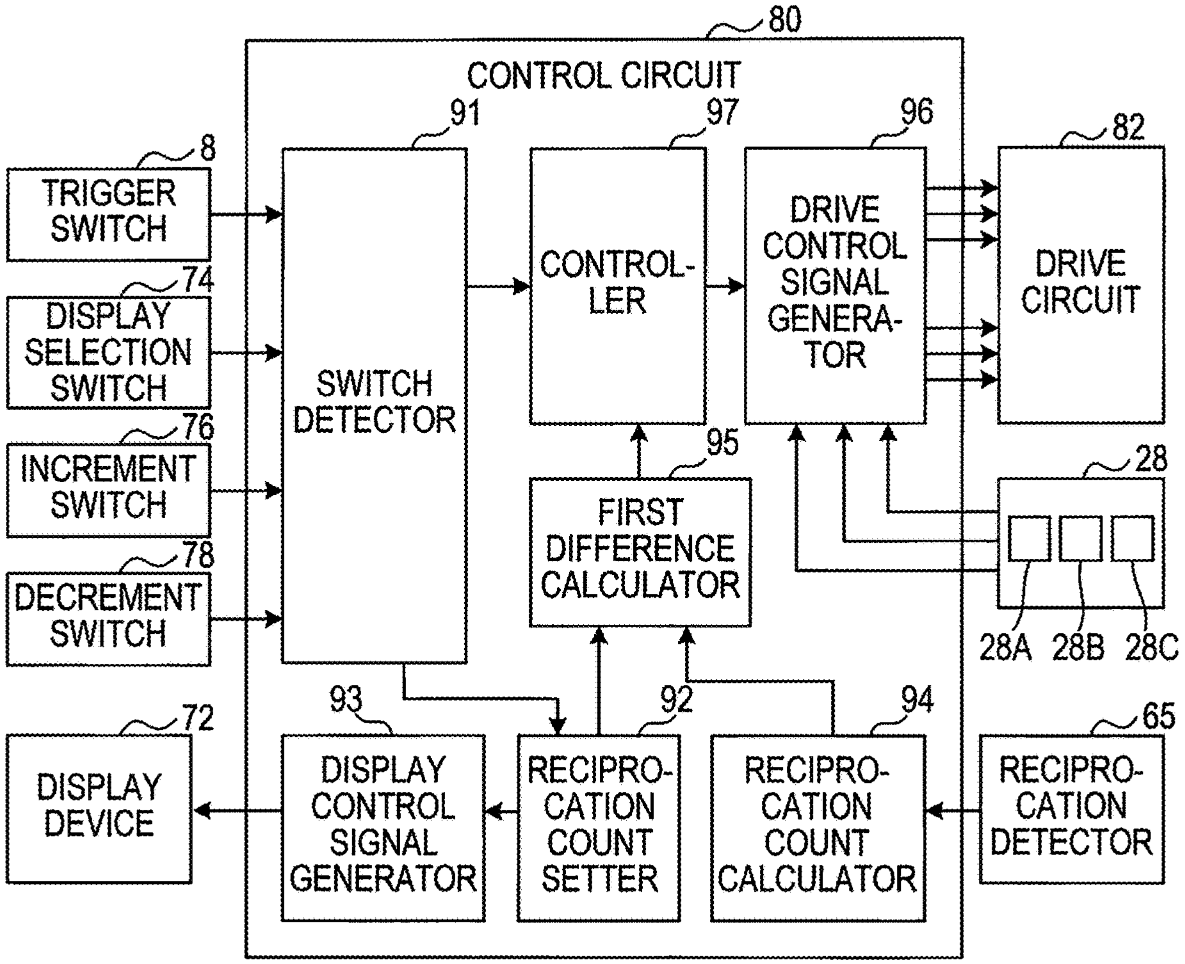
FIG. 5 is a functional block diagram of a control circuit in the electric-powered lubricator.

As shown in FIG. 5, the control circuit 80 has respective functions of a switch detector 91, a reciprocation count setter 92, a display control signal generator 93, a reciprocation count calculator 94, a first difference calculator 95, a drive control signal generator 96, and a controller 97. In the first embodiment, the functions of the switch detector 91, the reciprocation count setter 92, the display control signal generator 93, the reciprocation count calculator 94, the first difference calculator 95, the drive control signal generator 96, and the controller 97 are implemented on the control circuit 80 by software. In another embodiment, at least one of the functions of the switch detector 91, the reciprocation count setter 92, the display control signal generator 93, the reciprocation count calculator 94, the first difference calculator 95, the drive control signal generator 96, and the controller 97 may be implemented on the control circuit 80 not by software but by hardware (i.e. an electronic circuit).

The switch detector 91 is configured (i) to receive an input from the trigger switch 8 and (ii) to indicate the controller 97 whether the trigger switch 8 is manually operated based on the input received. The switch detector 91 is also configured (i) to receive respective inputs from the display selection switch 24, the increment switch 76, and the decrement switch 78 and (ii) to indicate the reciprocation count setter 92 whether those switches are manually operated based on the respective inputs received.

The reciprocation count setter 92 is configured to set a setting value based on the indication by the switch detector 91. The setting value corresponds to a desired count of reciprocation of the plunger 50.

The display control signal generator 93 is configured (i) to generate the display control signal for displaying on the display device 72 the setting value set by the reciprocation count setter 92 and (ii) to output the generated display control signal to the display device 72.

The reciprocation count calculator 94 is configured (i) to calculate the count of reciprocation of the plunger 50 based on the reciprocation detection signal input from the reciprocation detector 65 and (ii) to update a calculated value. The calculated value corresponds to the calculated count of reciprocation of the plunger 50.

The first difference calculator 95 is configured to calculate a difference between (i) the setting value set by the reciprocation count setter 92 and (ii) the calculated value updated by the reciprocation count calculator 94. The difference corresponds to the remaining count of reciprocation of the plunger 50 required to dispense the desired amount of grease.

The drive control signal generator 96 is configured (i) to receive the first through third rotation signals from the first through third rotational position sensors 28 A through 28 C and (ii) to detect the rotational position of the rotor 22 based on the first through third rotation signals received.

The drive control signal generator 96 is also configured (i) to generate the above-described first through sixth drive control signals for rotating the electric motor 20 based on a drive command received from controller 97 and the detected rotational position of the rotor 22 and (ii) to output the generated first through sixth drive control signals to the drive circuit 82. More specifically, the drive command output from the controller 97 includes a desired rotational speed (or a target rotational speed) of the electric motor 20. The drive control signal generator 96 (*i*) calculates the actual rotational speed of the electric motor 20 based on the first through third rotation signals received from the sensor circuit board 28 and (ii) generates the first through sixth drive control signals so as to maintain the actual rotational speed of the electric motor 20 at the desired rotational speed. In accordance with the first through sixth drive control signals, the drive circuit 82 delivers three-phase currents to the three coils 24 of the stator 21 to rotate the rotor 22 (and thus the rotation shaft 30). As a result, the plunger 50 reciprocates at a speed corresponding to the actual rotational speed of the electric motor 20, and the grease is dispensed from the dispensing port 66A.

The drive control signal generator 96 is also configured (i) to generate the first through sixth drive control signals for stopping the electric motor 20 based on a stop command received from the controller 97 and (ii) to output the generated first through sixth drive control signals to drive circuit 82. In accordance with the first through sixth drive control signals, the drive circuit 82 stops the rotor 22 (and thus the rotation shaft 30) by (i) interrupting the three-phase currents to the three coils 24 of the stator 21 or (ii) shorting all of the ends of the three coils 24 to the ground (and thus applying a breaking force to the electric motor 20).

The controller 97 is configured to output the drive command or the stop command to the drive control signal generator 96 based on (i) the indication from the switch detector 91 and (ii) the difference calculated by the first difference calculator 95.

2-1-6. Summary of Operation of Controller

In the electric-powered lubricator 1, the flow rate of the grease dispensed from the dispensing port 66A (i.e. the mass or the volume of the grease dispensed per unit time) varies in accordance with the rotational speed of the electric motor 20.

Figure 6A:
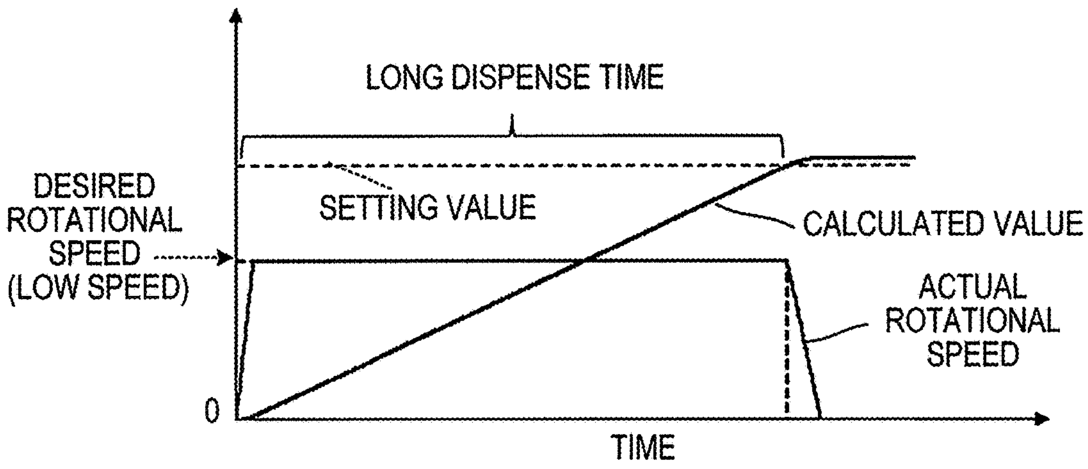
FIGS. 6A and 6B are time charts describing problems of conventional techniques of controlling a rotational speed of an electric motor to be constant.

As shown in FIG. 6A, when the desired rotational speed of the electric motor 20 is set to be low, the flow rate of grease decreases, and the time required to dispense the desired amount of grease can be long. In other words, the dispensing efficiency of the grease can be lowered.

Figure 6B:
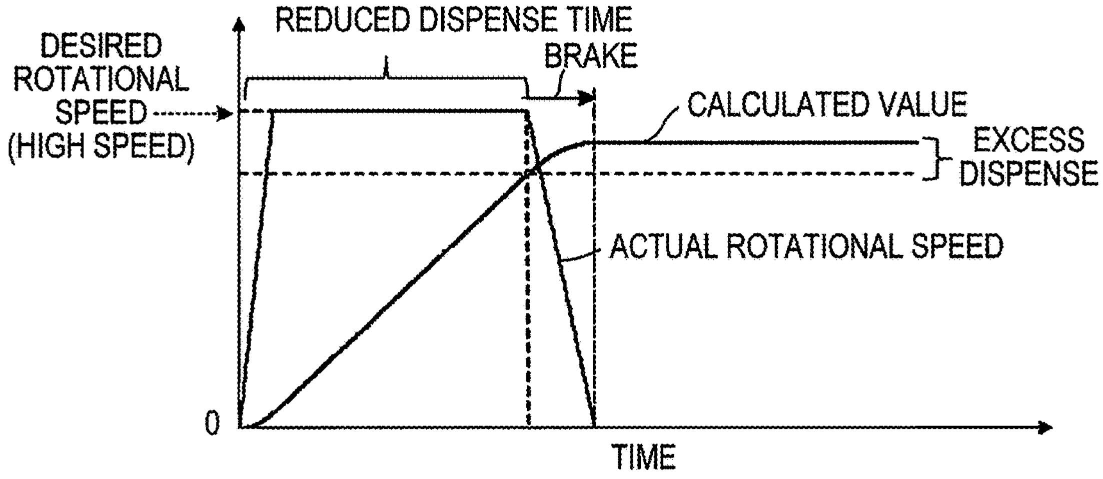

On the other hand, as shown in FIG. 6B, when the desired rotational speed of the electric motor 20 is set to be high, the flow rate of grease increases, and the time required to dispense the desired amount of grease can be reduced. However, the electric motor 20 cannot quickly stop even when the braking force is applied to the electric motor 20 immediately after the driving of the motor is stopped at the time when the desired amount of grease is dispensed. As a result, excess grease can be dispensed.

Figure 7:
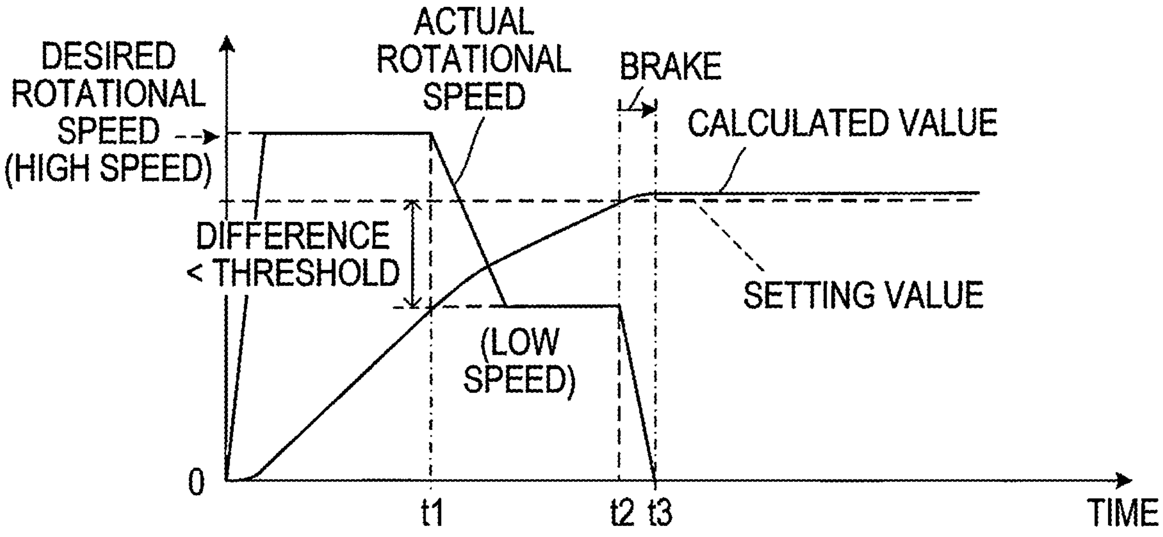
FIG. 7 is a time chart illustrating a change in a rotational speed of an electric motor in the first embodiment.

In the first embodiment, as shown in FIG. 7, when the trigger switch 8 is manually operated to start driving of the electric motor 20, the controller 97 sets the desired rotational speed high and dispenses the grease at a high flow rate. Thereafter, when the difference, in other words, the remaining count of reciprocation of the plunger 50 decreases to a specified threshold (at the time point t1), the controller 97 decreases the desired rotational speed and thus the flow rate of grease. The threshold in the first embodiment corresponds to the remaining count of reciprocation of the plunger 50 at which the deceleration of the electric motor 20 should start.

When the calculated value reaches the setting value (at the time point t2), the controller 97 stops driving of the electric motor 20. As a result, the electric motor 20 and the plunger 50 stop in a short time (at the time point t3), and excess grease can be suppressed from being dispensed.

2-1-7. Details of Process Executed by Control Circuit 2-1-7-1. First Control Process A first control process repeatedly executed by the control circuit 80 during the operation of the control circuit 80 will be described. The functions of the switch detector 91, the reciprocation count setter 92, the display control signal generator 93, the reciprocation count calculator 94, the first difference calculator 95, the drive control signal generator 96, and the controller 97 are implemented in the first control process. During the execution of the first control process, the display device 72 displays the above-described setting value.

Figure 8:
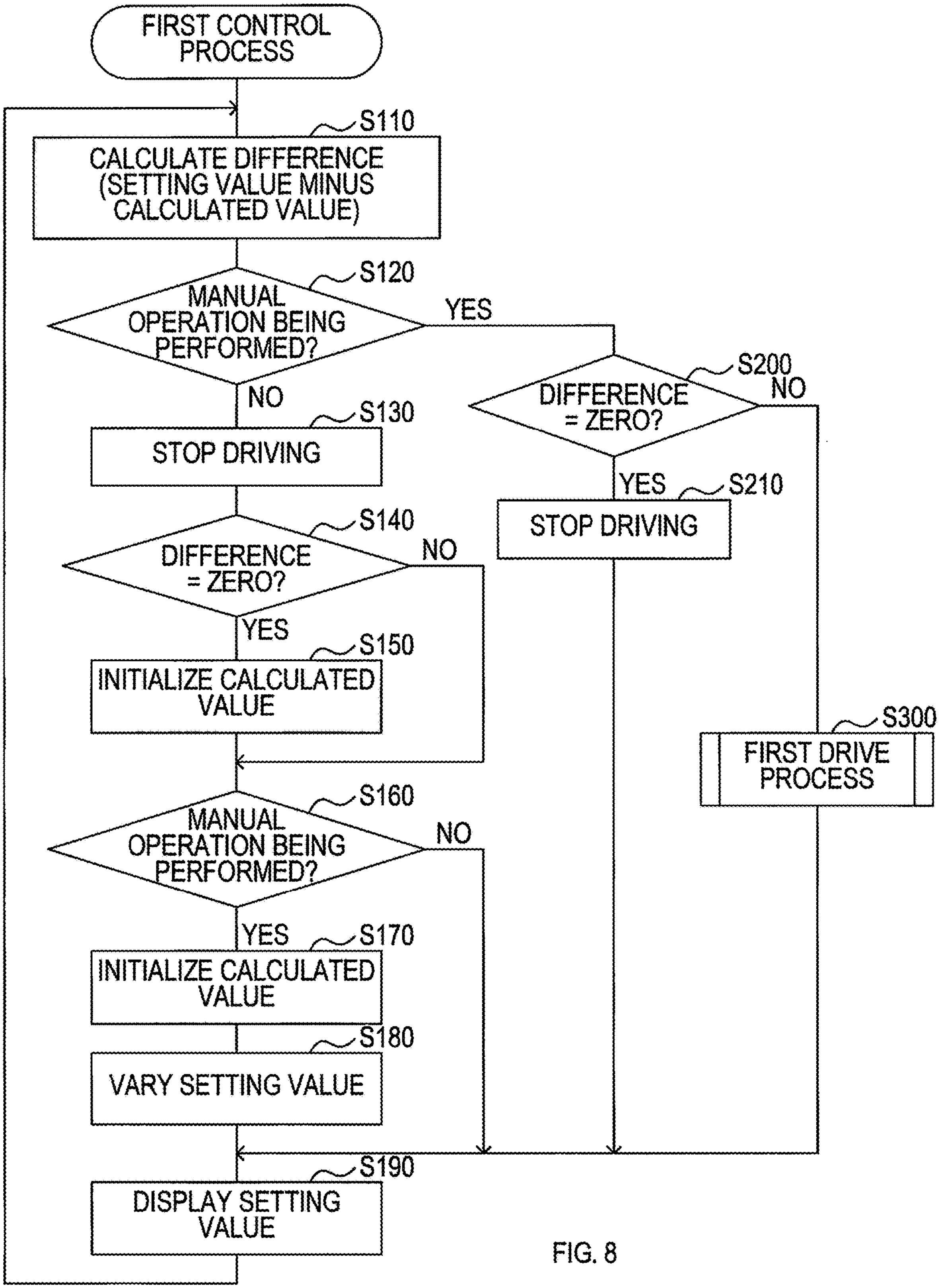
FIG. 8 is a flowchart showing a flow of a first control process.

As shown in FIG. 8, when the first control process is started, the control circuit 80 firstly calculates the difference between the setting value and the calculated value (i.e. the setting value minus the calculated value) in S110.

In subsequent S120, the control circuit 80 determines whether the trigger switch 8 is manually operated. When the trigger switch 8 is manually operated (S120: YES), the control circuit 80 proceeds to S200. When the trigger switch 8 is not manually operated (S120: NO), the control circuit 80 proceeds to S130.

In S130, the control circuit 80 outputs, to the drive circuit 82, the first through sixth drive control signals for stopping driving of the electric motor 20 and proceeds to S140. In order to quickly stop the rotation of the electric motor 20, in S130, the control circuit 80 (*i*) outputs, to the drive circuit 82, the first through sixth drive control signals for interrupting the currents to the electric motor 20 and then (ii) outputs, to the drive circuit 82, the first through sixth drive control signals for applying the breaking force to the electric motor 20.

In S140, the control circuit 80 determines whether the difference calculated in S110 is zero, that is, whether the calculated value reaches the setting value. When the difference is zero (S140: YES), the control circuit 80 proceeds to S150 to initialize (or reset) the calculated value, and proceeds to S160. In the first embodiment, the control circuit 80 sets the calculated value to zero in S150. In another embodiment, the control circuit 80 may set the calculated value to a numerical value other than zero. When the difference is not zero (S140: NO), the control circuit 80 immediately proceeds to S160.

In S160, the control circuit 80 determines whether the increment switch 76 or the decrement switch 78 is manually operated. When the increment switch 76 or the decrement switch 78 is manually operated (S160: YES), the control circuit 80 proceeds to S170 and initializes the calculated value. In subsequent S180, the control circuit 80 varies (i.e. increases or decreases) the setting value in accordance with the manual operation performed on the increment switch 76 or the decrement switch 78, and proceeds to S190.

When the increment switch 76 or the decrement switch 78 is not manually operated (S160: NO), the control circuit 80 immediately proceeds to S190. In S190, the control circuit 80 outputs, to the display device 72, the display control signal for displaying the setting value on the first through third display screens 72A through 72C to display the setting value on the display device 72. Upon completion of the display of the setting value, the control circuit 80 returns to S110.

In S200, similarly to S140, the control circuit 80 determines whether the difference calculated in S110 is zero. When the difference is zero (S200: YES), the control circuit 80 proceeds to S210 to output, to the drive circuit 82, the first through sixth drive control signals for stopping driving of the electric motor 20, and proceeds to S190. In S210, the control circuit 80 operates as in S130 described above.

In S200, when the difference is not zero (S200: NO), that is, when it is necessary to dispense the grease from the dispensing port 66A, the control circuit 80 proceeds to S300 and executes a first drive process shown in FIG. 9. Upon completion of the first drive process, the control circuit 80 proceeds to S190.

2-1-7-2. First Drive Process

Figure 9:
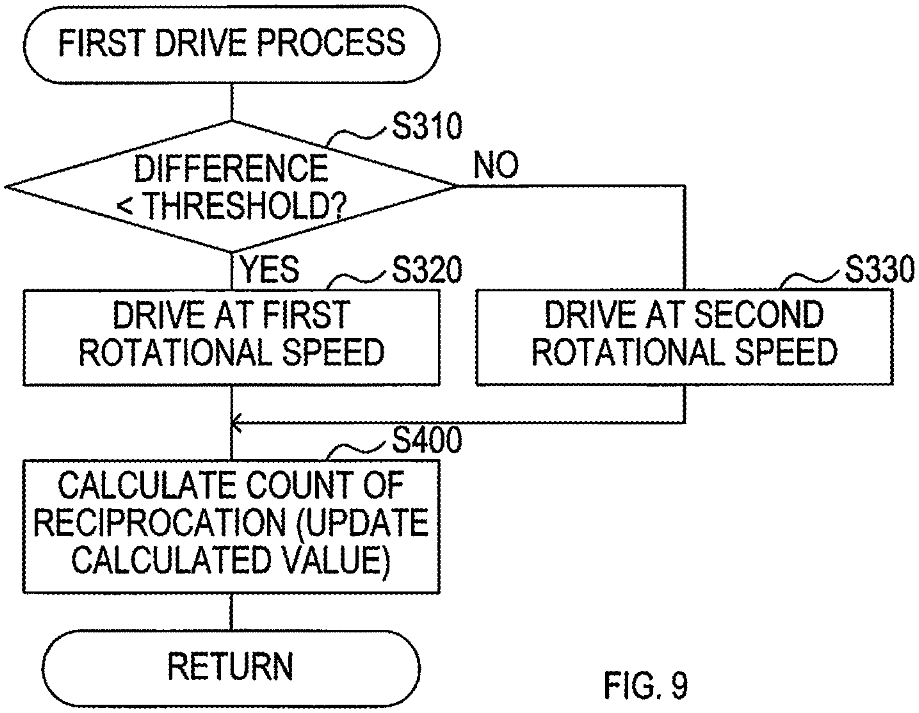
FIG. 9 is a flowchart showing a flow of a first drive process.

As shown in FIG. 9, in the first drive process, the control circuit 80 determines in S310 whether the difference calculated in S110 is less than a preset threshold. When the difference is less than the threshold (S310: YES), the control circuit 80 proceeds to S320 and outputs, to the drive circuit 82, the first through sixth drive control signals for driving the electric motor 20 at a first rotational speed.

When the difference is greater than or equal to the threshold (S310: NO), the control circuit 80 proceeds to S330 and outputs, to the drive circuit 82, the first through sixth drive control signals for driving the electric motor 20 at a second rotational speed. The second rotational speed is higher than the first rotational speed.

The first rotational speed and the second rotational speed are desired rotational speeds (or target rotational speeds) of the electric motor 20. As shown in FIG. 7, the electric motor 20 is driven at the second rotational speed from the start of driving of the electric motor 20 to the time point t1 at which the difference reaches the threshold. When the difference falls below the threshold thereafter, the electric motor 20 is driven at the first rotational speed.

After the electric motor 20 is driven at the first rotational speed or the second rotational speed in S320 or S330, the control circuit 80 proceeds to S400. In S400, the control circuit 80 calculates the count of reciprocation of the plunger 50 based on the reciprocation detection signal to update the calculated value (i.e. to overwrite the previous calculated value with the new calculated value), and terminates the first drive process.

Therefore, as shown in FIG. 7, the driving of the electric motor 20 is stopped when the difference reaches zero at the time point t2 after the desired rotational speed of the electric motor 20 is shifted from the second rotational speed to the first rotational speed at the time point t1. Subsequently, the braking force is applied to the electric motor 20, and the rotation of the electric motor 20 is stopped.

When the driving of the electric motor 20 is stopped in this manner, since the actual rotational speed of the electric motor 20 decreases to the first rotational speed, the time required for the electric motor 20 to actually stop can be shorter than the time illustrated in FIG. 6B.

2-1-8. Technical Effects in First Embodiment

In the electric-powered lubricator 1 of the first embodiment, the time required for the grease to be dispensed can be reduced by rotating the electric motor 20 at a high speed immediately after the start of the dispense of the grease. In addition, excess grease can be suppressed from being dispensed after the drive of the electric motor 20 is stopped. Therefore, the dispense of the grease can be performed efficiently and more appropriately in the first embodiment.

2-1-9. Correspondence Between Terms

In the first embodiment, the trigger switch 8 corresponds to an example of the first manual switch in Overview of Embodiments. Each of the increment switch 76 and the decrement switch 78 corresponds to an example of the at least one second manual switch in Overview of Embodiments.

2-2. Variations of First Embodiment

In the above first embodiment, in the first drive process of S300, the desired rotational speed and the actual rotational speed of the electric motor 20 are varied in two steps from the second rotational speed to the first rotational speed in accordance with the difference.

However, the desired rotational speed and the actual rotational speed may be varied in three or more steps in accordance with the difference. Alternatively, the desired rotational speed and the actual rotational speed may be continuously decreased in accordance with a decrease in the difference.

First through third variations in which the desired rotational speed and the actual rotational speed of the electric motor 20 is controlled in this manner will be described below.

2-2-1. First Variation

The electric-powered lubricator 1 of the first variation is different from the electric-powered lubricator 1 of the first embodiment in that a second drive process is executed in place of the first drive process. The second drive process corresponds to the first drive process with some partial modifications. Therefore, the following description focuses only on the portions modified from the first drive process.

2-2-1-1. Second Drive Process

Figure 10:
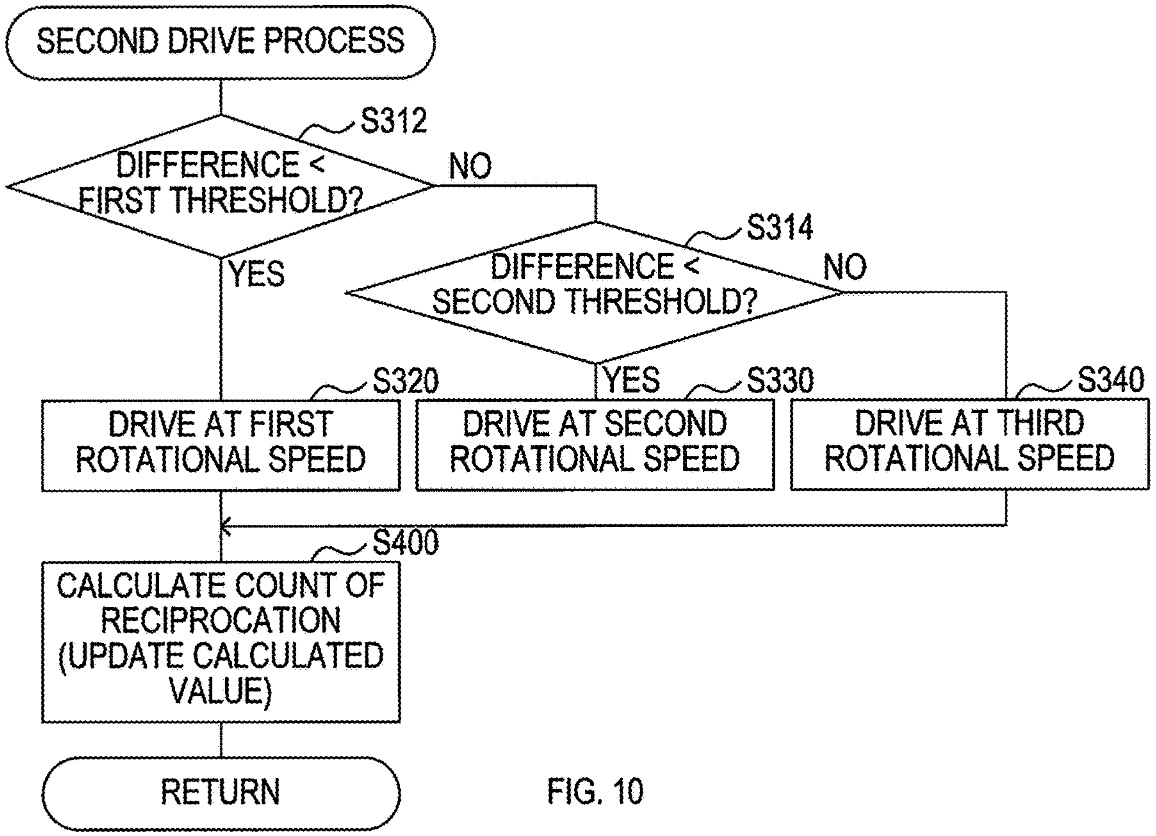
FIG. 10 is a flowchart showing a flow of a second drive process.

As shown in FIG. 10, the second drive process is different from the first drive process in that (i) S310 is replaced with S312 and (ii) S314 and S340 are added.

Specifically, in S312, the control circuit 80 determines whether the difference is less than a preset first threshold. When the difference is less than the first threshold (S312: YES), the control circuit 80 proceeds to S320. The first threshold in the first variation corresponds to the remaining count of reciprocation of the plunger 50 at which the drive of the electric motor at the first rotational speed should be started.

When the difference is greater than or equal to the first threshold (S312: NO), the control circuit 80 proceeds to S314 and determines whether the difference is less than a preset second threshold. The second threshold in the first variation corresponds to the remaining count of reciprocation of the plunger 50 at which the drive of the electric motor at the second rotational speed should be started. The second threshold is larger than the first threshold.

When the difference is less than the second threshold (S314: YES), the control circuit 80 proceeds to S330. When the difference is greater than or equal to the second threshold (S314: NO), the control circuit 80 proceeds to S340 and outputs, to the drive circuit 82, the first through sixth drive control signals for driving the electric motor 20 at a third rotational speed. The third rotational speed is higher than the second rotational speed.

After the electric motor 20 is driven at any one of the first through third rotational speeds in S320 through S340, the control circuit 80 proceeds to S400.

2-2-1-2. Technical Effects in First Variation

With the second drive process, the desired rotational speed and the actual rotational speed of the electric motor 20 decrease from the third rotational speed to the second rotational speed and from the second rotational speed to the first rotational speed in accordance with the difference.

Therefore, in the first variation, the time required for the electric motor 20 to actually stop after the driving of the electric motor 20 is stopped can be more reliably reduced.

In the second drive process, the desired rotational speed and the actual rotational speed of the electric motor 20 vary in three steps.

Figure 11:
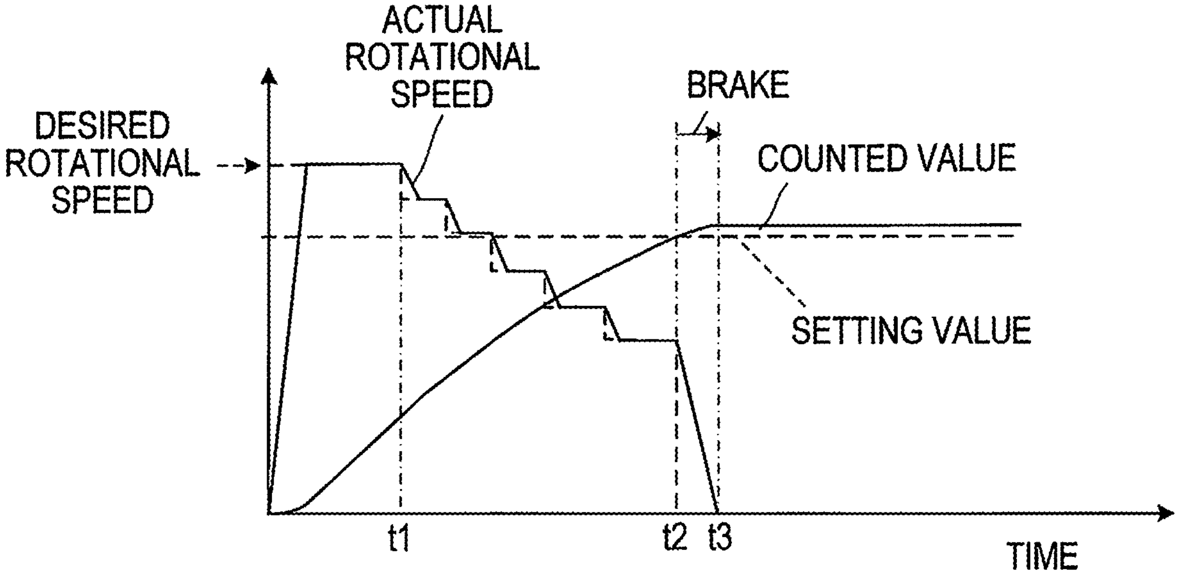
FIG. 11 is a time chart illustrating a change in a rotational speed of an electric motor in a first variation.

However, as illustrated in FIG. 11, the desired rotational speed and the actual rotational speed may vary in four or more steps. FIG. 11 illustrates an example in which the desired rotational speed and the actual rotational speed vary in six steps. In this case, in the second drive process, the difference is compared with five thresholds.

When the desired rotational speed and the actual rotational speed decrease through many steps, the electric motor 20 can be temporarily rotated at a high rotational speed even if the setting value is small.

2-2-2. Second Variation

The electric-powered lubricator 1 of the second variation is different from the electric-powered lubricator 1 of the first embodiment in that a third drive process is executed in place of the first drive process. The third drive process corresponds to the first drive process with some partial modifications. Therefore, the following description focuses only on the portions modified from the first drive process.

2-2-2-1. Third Drive Process

Figure 12:
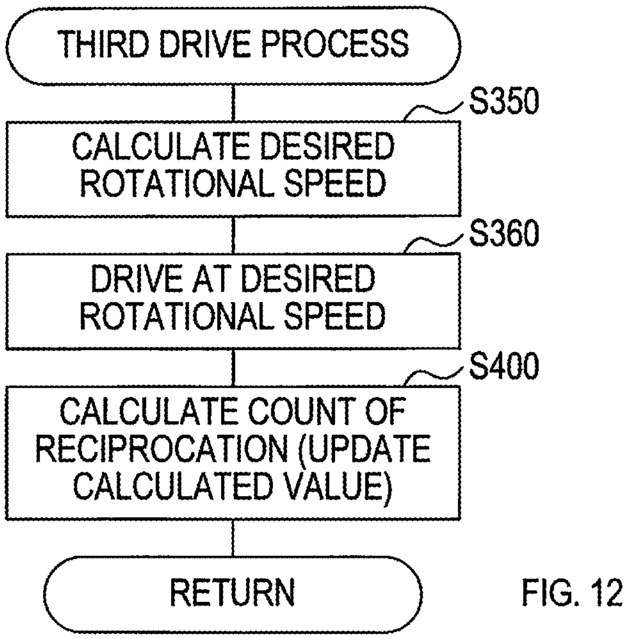
FIG. 12 is a flowchart showing a flow of a third drive process.

As shown in FIG. 12, the third drive process is different from the first drive process in that (i) S310 through S330 are removed and (ii) S350 and S360 are added.

Specifically, in S350, the control circuit 80 calculates the desired rotational speed of the electric motor 20 based on the difference. In the second variation, the control circuit 80 calculates the desired rotational speed based on the following equation (1).

$$\text{Desired rotational speed} = \text{difference} \times \text{coefficient} + \text{minimum rotational speed} \tag{1}$$

In the above-described equation (1), the coefficient and the minimum rotational speed are set in advance.

In subsequent S360, the control circuit 80 outputs, to the drive circuit 82, the first through sixth drive control signals for driving the electric motor 20 at the desired rotational speed calculated in S350, and proceeds to S400.

2-2-2-2. Technical Effects in Second Variation

In the second variation, since the desired rotational speed of the electric motor 20 is set based on the difference, the desired rotational speed is set to the maximum rotational speed corresponding to the setting value immediately after the start of driving of the electric motor 20. Thereafter, as the calculated value increases and the difference decreases, the desired rotational speed decreases, and thus the actual rotational speed also decreases.

In other words, the desired rotational speed and the actual rotational speed continuously decrease in accordance with the difference after the start of driving of the electric motor 20. As a result, the desired rotational speed and the actual rotational speed can be sufficiently decreased when the driving of the electric motor 20 is stopped.

Therefore, also in the second variation, the time required for the grease to be dispensed can be reduced. In addition, excess grease can be suppressed from being dispensed after the stop of driving of the electric motor 20.

2-2-3. Third Variation

The electric-powered lubricator 1 of the third variation is different from the electric-powered lubricator 1 of the first embodiment in that a fourth drive process is executed in place of the first drive process. The fourth drive process corresponds to the first drive process with some partial modifications. Therefore, the following description focuses only on the portions modified from the first drive process.

2-2-3-1. Fourth Drive Process

Figure 13:
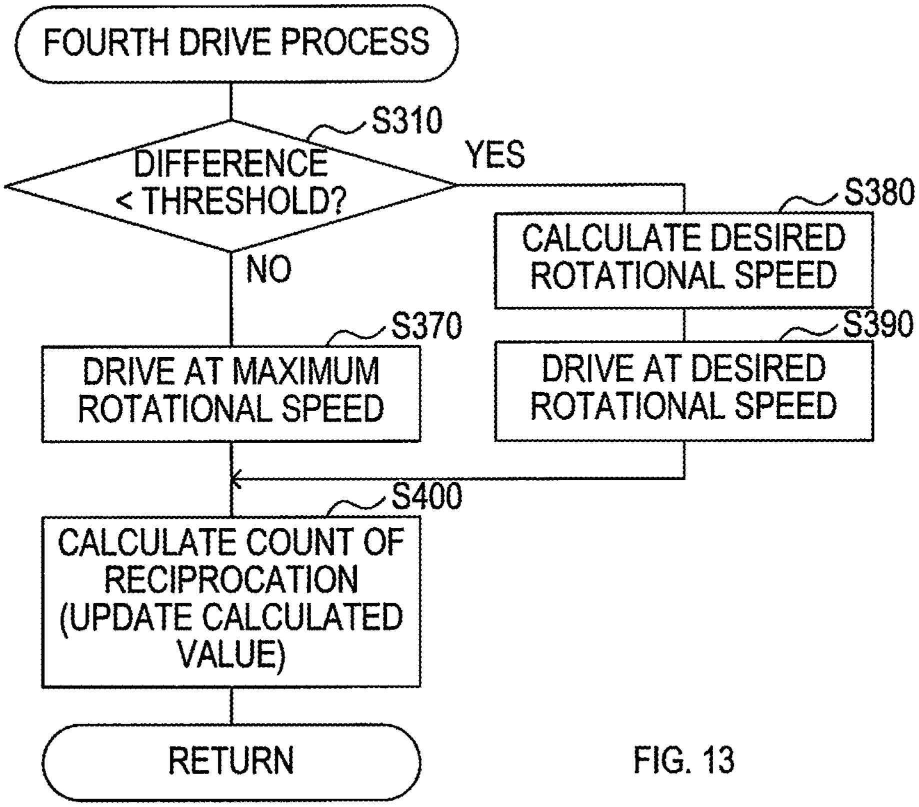
FIG. 13 is a flowchart showing a flow of a fourth drive process.

As shown in FIG. 13, the fourth drive process is different from the first drive process in that (i) S320 and S330 are removed and (ii) S370 through S390 are added.

Specifically, when the difference is greater than or equal to the threshold in S310 (S310: NO), the control circuit 80 proceeds to S370. In S370, the control circuit 80 outputs, to the drive circuit 82, the first through sixth drive control signals for driving the electric motor 20 at a preset maximum rotational speed, and proceeds to S400. In the third variation, the maximum rotational speed is the rated rotational speed of the electric motor 20, but is not limited to the rated rotational speed.

When the difference is less than the threshold (S310: YES), the control circuit 80 proceeds to S380. In S380, the control circuit 80 calculates the desired rotational speed of the electric motor 20 based on the above-described equation (1), and proceeds to S390.

In S390, the control circuit 80 output, to the drive circuit 82, the first through sixth drive control signals for driving the electric motor 20 at the desired rotational speed calculated in S380, and proceeds to S400.

2-2-3-2. Technical Effects in Third Variation

Figure 14:
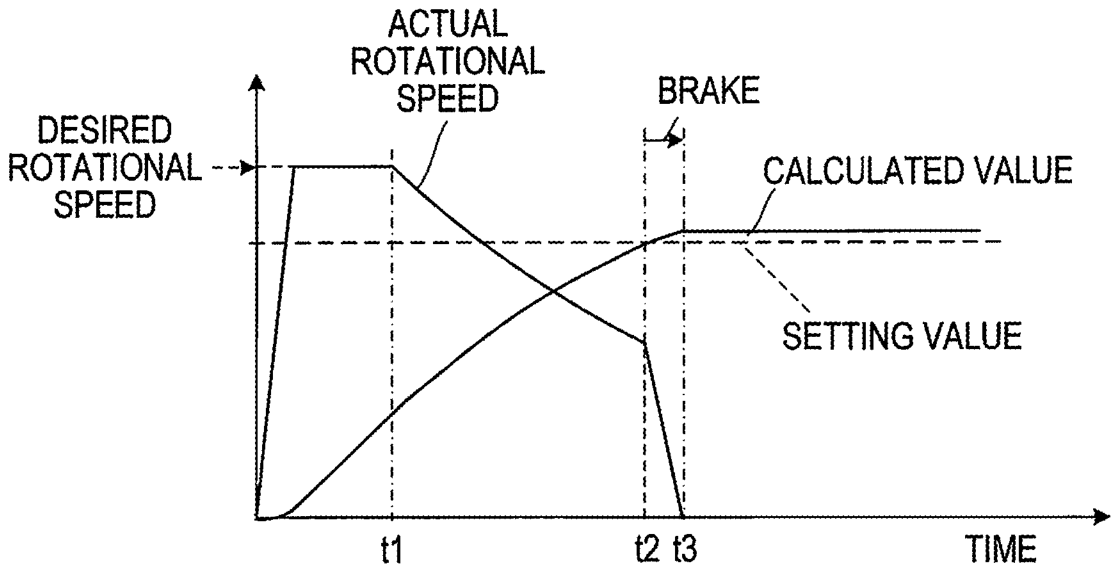
FIG. 14 is a time chart illustrating a change in a rotational speed of an electric motor in a third variation.

In the third variation, as shown in FIG. 14, the electric motor 20 is driven at the preset maximum rotational speed from the start of driving of the electric motor 20 to the time point t1 at which the difference reaches the threshold. After the time point t1, the desired rotational speed is set in accordance with the difference, and then the desired rotational speed and the actual rotational speed decrease as the difference decreases.

Therefore, the third variation can also exhibit the same effects as those in the second variation. In addition, in the third variation, since the electric motor 20 is driven at the maximum rotational speed until the difference reaches the threshold after the start of driving of the electric motor 20, the time required for the grease to be dispensed can be reduced as compared with the second variation.

2-2-4. Fourth Variation

The electric-powered lubricator 1 of the fourth variation is different from the electric-powered lubricator 1 of the first embodiment in that a second control process is executed in place of the first control process. The second control process corresponds to the first control with some partial modifications. Therefore, the following description focuses only on the portions modified from the first control process.

2-2-4-1. Second Control Process

In the first control process, even when the manual operation on the trigger switch 8 is stopped (i.e. the trigger switch 8 is released) and the driving of the electric motor 20 is stopped, the calculated value is not initialized until the control circuit 80 determines in S140 that the difference is zero.

With the calculated value being held until the difference reaches zero, excess grease can be suppressed from being dispensed when the trigger switch 8 is manually operated again and the dispensing of grease is restarted.

Figure 15:
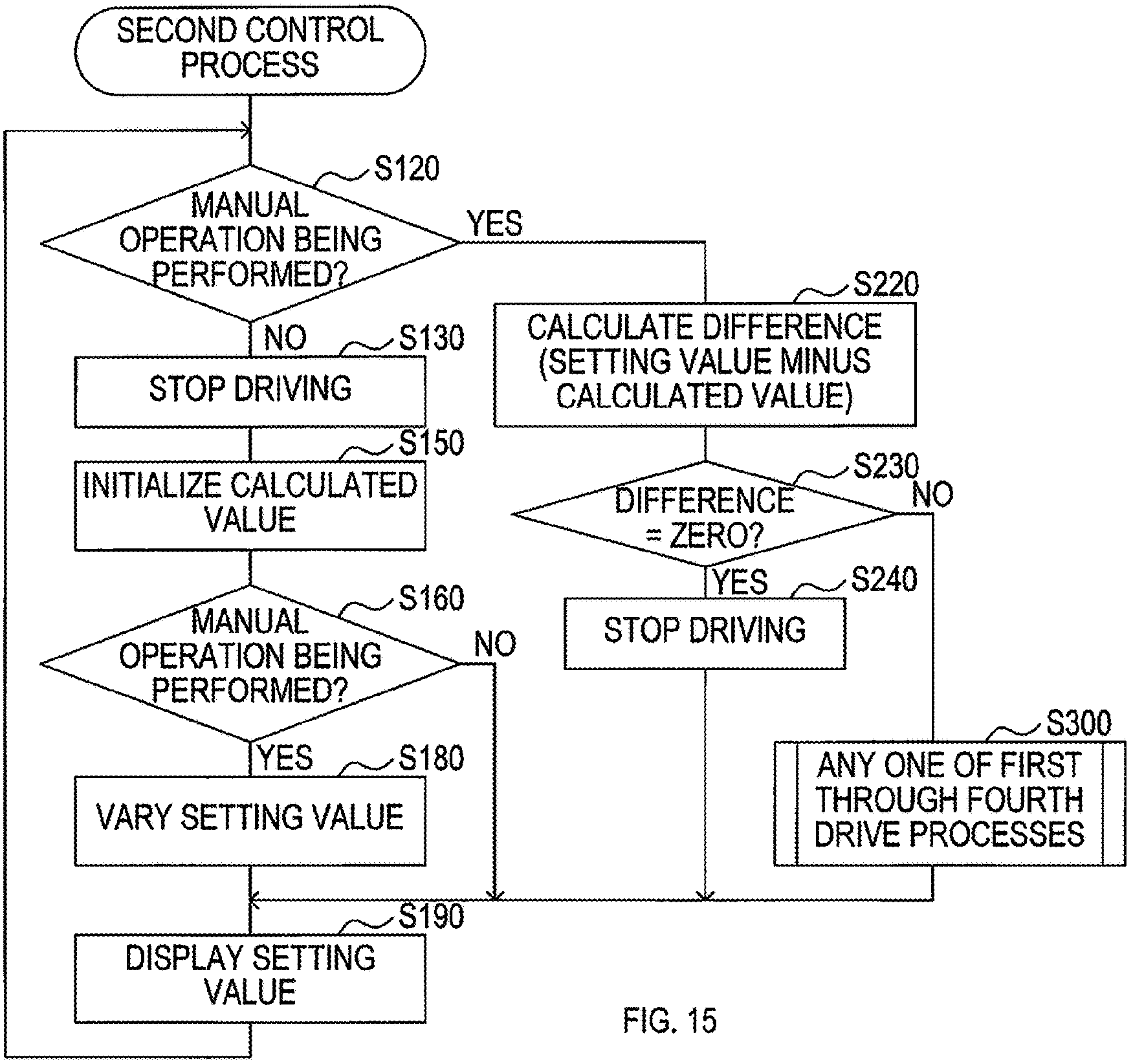
FIG. 15 is a flowchart showing a flow of a second control process.

On the other hand, as shown in FIG. 15, the second control process is different from the first control process in that (i) S110, S140, S170, S200, and S210 are removed and (ii) S220 through S240 are added.

More specifically, when the trigger switch 8 is not manually operated in S120 (S120: NO), the control circuit 80 does not determine whether the difference is zero in S140, and proceeds to S150 to initialize the calculated value.

Therefore, in the fourth variation, when the user temporarily stops the manual operation on the trigger switch 8 and then restarts the manual operation on the trigger switch 8, the user can dispense the grease from the beginning.

In the second control process, since the calculated value is initialized when the manual operation on the trigger switch 8 is stopped, the process of S170 in the first control process is not executed.

When the trigger switch 8 is manually operated in S120 (S120: YES), the control circuit 80 proceeds to S220 and calculates the difference.

In subsequent S230, the control circuit determines whether the calculated difference is zero. When the difference is zero (S230: YES), the control circuit 80 proceeds to S240. In S240, the control circuit 80 outputs, to the drive circuit 82, the first through sixth drive control signals for stopping driving of the electric motor 20.

In S230, when the difference is not zero (S230: NO), the control circuit 80 proceeds to S300 and executes any one of the first through fourth drive process described above. Upon completion of the process of S240 or S300, the control circuit 80 proceeds to S190.

2-3. Second Embodiment

Figure 16:
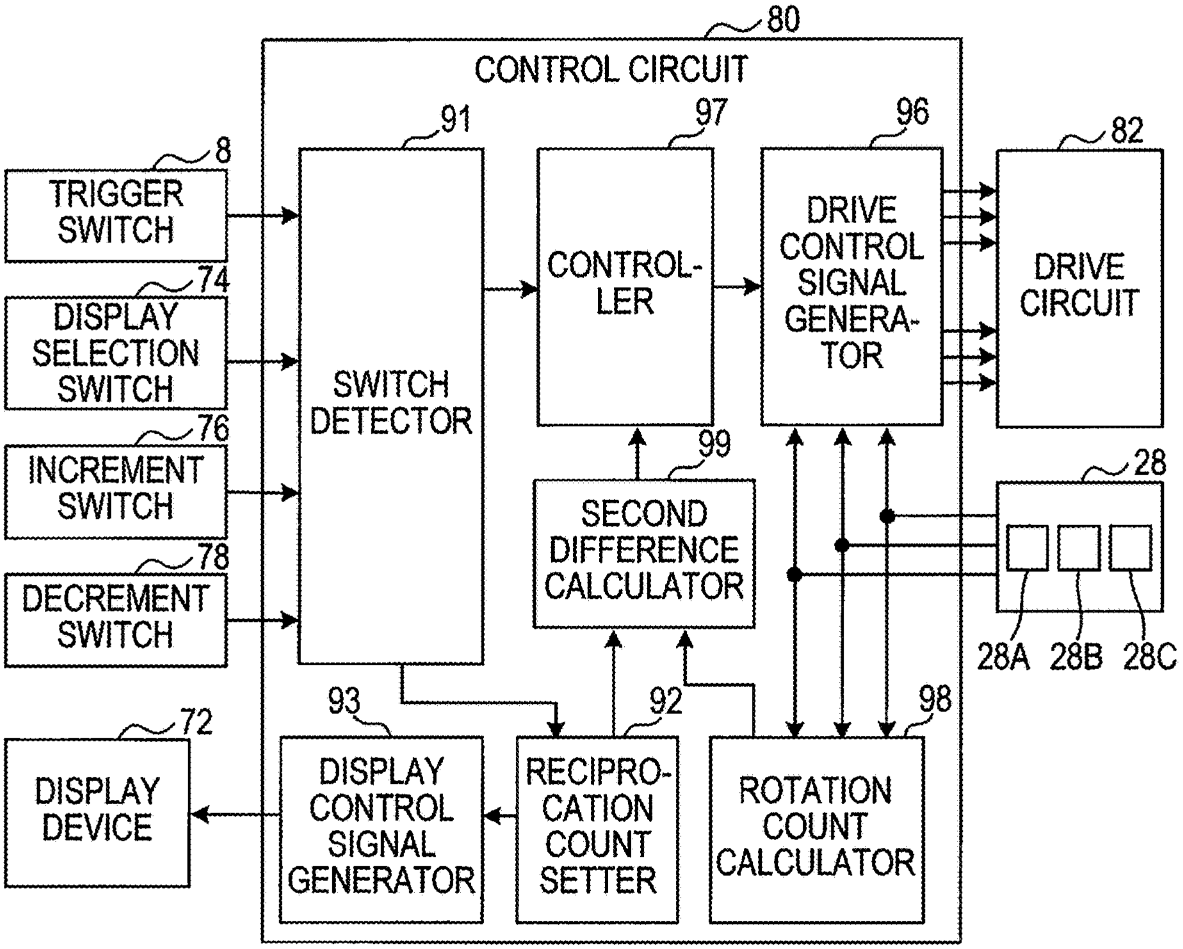
FIG. 16 is a functional block diagram of a control circuit in a second embodiment.

The electric-powered lubricator 1 of the second embodiment corresponds to the electric-powered lubricator 1 of the first embodiment with some partial modifications. More specifically, as shown in FIG. 16, the electric-powered lubricator 1 of the second embodiment is different from the electric-powered lubricator 1 of the first embodiment in that the reciprocation detector 65 is removed. Further, the electric-powered lubricator 1 of the second embodiment is different from the electric-powered lubricator 1 of the first embodiment in a function of the control circuit 80 and a part of process executed by the control circuit 80.

Therefore, the following description focuses only on the differences between the first and second embodiments.

2-3-1. Functional Configuration of Control Circuit

As shown in FIG. 16, in the second embodiment, as the reciprocation detector 65 is removed, the control circuit 80 includes a rotation count calculator 98 and a second difference calculator 99 in place of the reciprocation count calculator 94 and the first difference calculator 95.

The rotation count calculator 98 is configured (i) to receive the first through third rotation signals from the first through third rotational position sensors 28A through 28C, (ii) to calculate the count of rotations of the electric motor 20 based on the first through third rotation signals received, and (iii) to update the calculated value. In the second embodiment, the calculated value corresponds to the calculated count of rotations of the electric motor 20.

The second difference calculator 99 is configured (i) to convert the setting value set by the reciprocation count setter 92 (i.e. the desired count of reciprocation of the plunger 50) into the desired count of rotations of the electric motor 20 based on the gear ratio (or the reduction ratio) of the deceleration mechanism 43 and (ii) to calculate a difference between the converted setting value and the calculated value updated by the rotation count calculator 98. In the second embodiment, the count of reciprocation of the plunger 50 corresponds to a product (i.e. the result of multiplication) of (i) the count of rotations of the electric motor 20 and (ii) the gear ratio of the deceleration mechanism 43.

The controller 97 is configured (i) to start driving of the electric motor 20 at a high rotational speed, (ii) to decrease the desired rotational speed and the actual rotational speed of the electric motor 20 when the difference calculated by the second difference calculator 99 decreases to a specified threshold, and (iii) to output, to the drive circuit 82, the first through sixth drive control signals for stopping driving of the electric motor 20 when the calculated value reaches the converted setting value. The threshold in the second embodiment corresponds to the threshold in the first embodiment, but it is converted into the count of rotations of the electric motor.

Therefore, also in the second embodiment, when the driving of the electric motor 20 is stopped, the electric motor 20 and the plunger 50 stop in a short time. As a result, the second embodiment can exhibit the same effects as those in the first embodiment.

2-3-2. Details of Process Executed by Control Circuit 2-3-2-1. Third Control Process The control circuit 80 in the second embodiment executes a third control process in place of the first control process.

Figure 17:
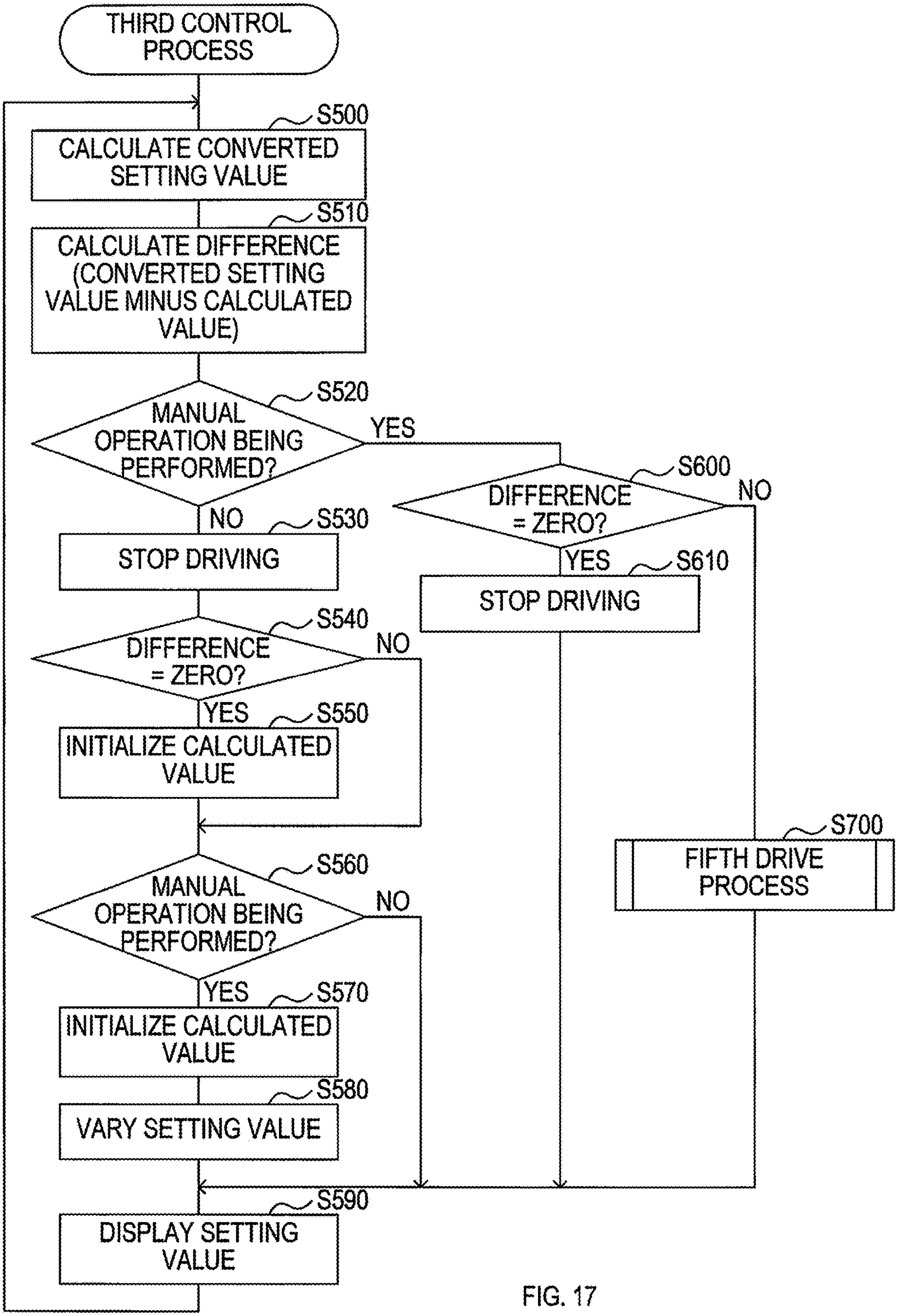
FIG. 17 is a flowchart showing a flow of a third control process.

As shown in FIG. 17, in the third control process, the control circuit 80 first calculates, based on the setting value and the gear ratio, the converted setting value in S500. In subsequent S510, the control circuit 80 calculates the difference between the converted setting value and the calculated value (i.e. the converted setting value minus the calculated value).

In subsequent S520, the control circuit 80 determines whether the trigger switch 8 is manually operated similarly to S120 described above. When the trigger switch 8 is manually operated (S520: YES), the control circuit 80 proceeds to S600. When the trigger switch 8 is not manually operated (S520: NO), the control circuit 80 proceeds to S530.

In S530, the control circuit 80 outputs, to the drive circuit 82, the first through sixth drive control signals for stopping driving of the electric motor 20 similarly to S130 described above, and proceeds to S540. In S540, the control circuit 80 determines whether the difference calculated in S510 is zero. When the difference is zero (S540: YES), the control circuit 80 proceeds to S550 to initialize (or reset) the calculated value, and proceeds to S560. When the difference is not zero (S540: NO), the control circuit 80 immediately proceeds to S560.

In S560, the control circuit 80 determines whether the increment switch 76 or the decrement switch 78 is manually operated. When the increment switch 76 or the decrement switch 78 is manually operated (S560: YES), the control circuit 80 proceeds to S570 to initialize (or reset) the calculated value. In subsequent S580, the control circuit 80 varies the setting value (i.e. the desired count of reciprocation of the plunger 50) in accordance with the manual operation performed on the increment switch 76 or the decrement switch 78, and proceeds to S590. When the increment switch 76 or the decrement switch 78 is not manually operated (S560: NO), the control circuit 80 immediately proceeds to S590. In S590, similarly to S190 described above, the control circuit 80 displays the setting value on the display device 72 by outputting, to the display device 72, the display control signal for displaying the setting value on the first through third display screens 72A through 72C. Upon completion of the display of the setting value, the control circuit 80 returns to S500.

In S600, the control circuit 80 determines whether the difference calculated in S510 is zero. When the difference is zero (S600: YES), the control circuit 80 proceeds to S610. In S610, the control circuit 80 outputs, to the drive circuit 82, the first through sixth drive control signals for stopping driving of the electric motor 20 similarly to S210 described above, and proceeds to S590.

When the difference is not zero (S600: NO), the control circuit 80 proceeds to S700 to execute a fifth drive process. Upon completion of the fifth drive process, the control circuit 80 proceeds to S590.

2-3-2-2. Fifth Drive Process

Figure 18:
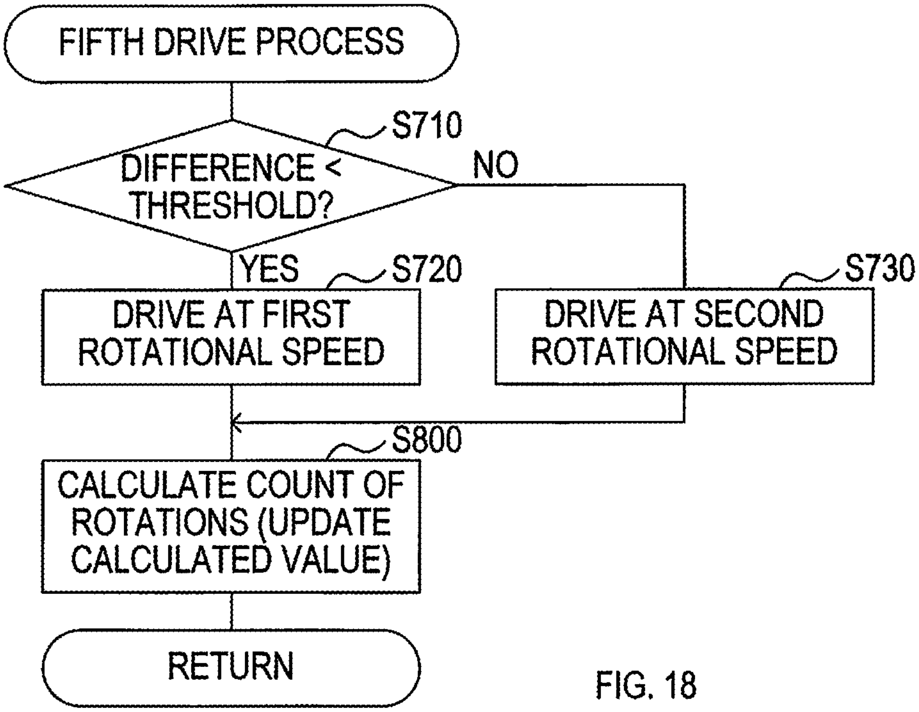
FIG. 18 is a flowchart showing a flow of a fifth drive process.

As shown in FIG. 18, the control circuit 80 determines in S710 whether the difference calculated in S510 is less than a preset threshold. When the difference is less than the threshold (S710: YES), the control circuit 80 proceeds to S720 and outputs, to the drive circuit 82, the first through sixth drive control signals for driving the electric motor 20 at the first rotational speed.

In S710, when the difference is greater than or equal to the threshold (S710: NO), the control circuit 80 proceeds to S730 and outputs, to the drive circuit 82, the first through sixth drive control signals for driving the electric motor 20 at the second rotational speed.

As a result, while the difference is greater than or equal to the threshold, the electric motor 20 is driven at the second rotational speed. When the difference falls below the threshold, the electric motor 20 is driven at the first rotational speed.

In subsequent S800, the control circuit 80 calculates the count of rotations of the electric motor 20 based on the first through third rotation signals, updates the calculated value, and terminates the fifth drive process.

2-3-3. Technical Effects in Second Embodiment

In the second embodiment, the desired rotational speed and the actual rotational speed of the electric motor 20 are reduced from the second rotational speed to the first rotational speed during the interval from when the difference reaches the threshold until when the driving of the electric motor 20 is stopped.

Therefore, also in the second embodiment, the time required for the electric motor 20 to actually stop can be reduced as compared with the time illustrated in FIG. 6B.

2-4. Variations of Second Embodiment

In the second embodiment described above, the fifth drive process can be modified similarly to the first through third variations described above. The third control process can be modified similarly to the fourth variation described above.

Hereinafter, fifth through eighth variations respectively corresponding to the first through fourth variations will be described.

2-4-1. Fifth Variation

The electric-powered lubricator 1 of the fifth variation is different from the electric-powered lubricator 1 of the second embodiment in that a sixth drive process is executed in place of the fifth drive process. The sixth drive process corresponds to the fifth drive process with some partial modifications. Therefore, the following description focuses only on the portions modified from the fifth drive process.

2-4-1-1. Sixth Drive Process

Figure 19:
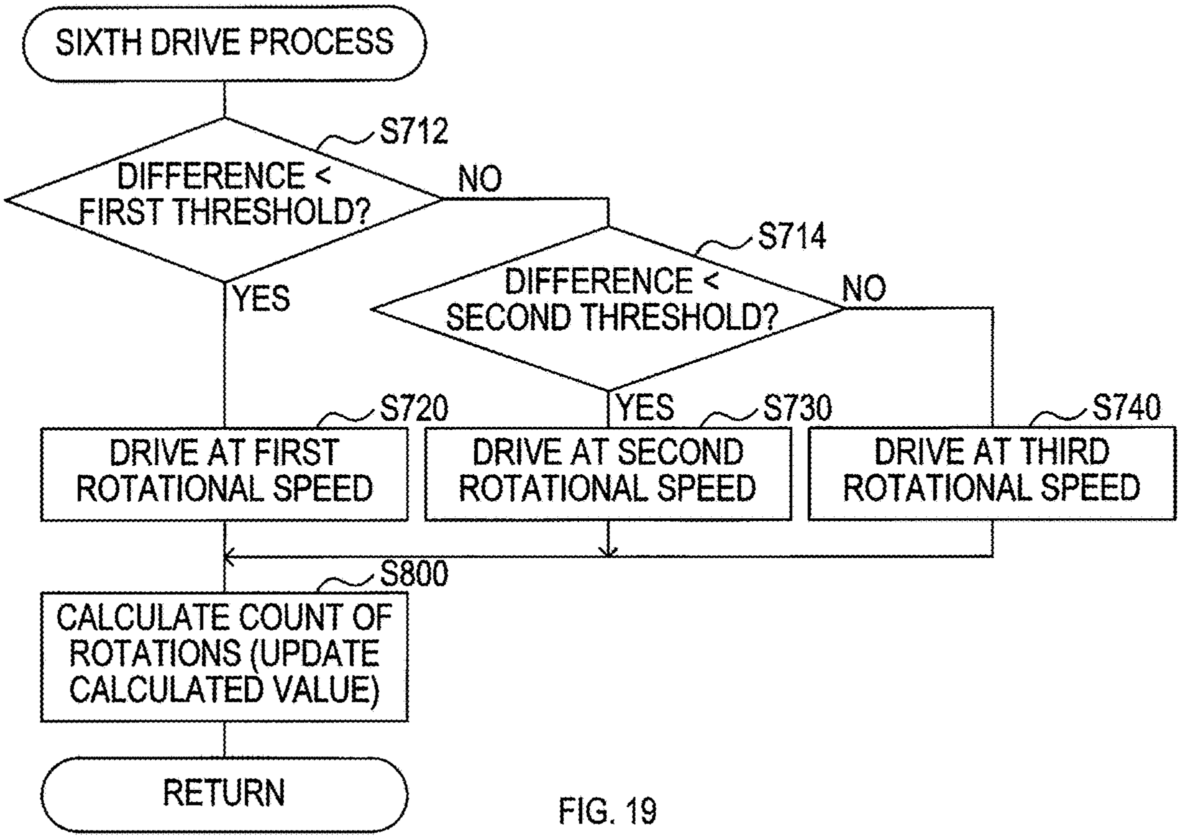
FIG. 19 is a flowchart showing a flow of a sixth drive process.

As shown in FIG. 19, the sixth drive process is different from the fifth drive process in that (i) S710 is replaced with S712 and (ii) S714 and S740 are added.

Specifically, in S712, the control circuit 80 determines whether the difference is less than a preset first threshold. The first threshold in the fifth variation corresponds to the first threshold in the first variation, but it is converted into the count of rotations of the electric motor 20.

When the difference is less than the first threshold (S712: YES), the control circuit 80 proceeds to S720. When the difference is greater than or equal to the first threshold (S712: NO), the control circuit 80 proceeds to S714 and determines whether the difference is less than a preset second threshold. The second threshold in the fifth variation corresponds to the second threshold in the first variation, but it is converted into the count of rotations of the electric motor 20.

When the difference is less than the second threshold (S714: YES), the control circuit 80 proceeds to S730. When the difference is greater than or equal to the second threshold (S714: NO), the control circuit 80 proceeds to S740 and outputs, to the drive circuit 82, the first through sixth drive control signals for driving the electric motor 20 at the third rotational speed.

After the electric motor 20 is driven at any one of the first through third rotational speeds in any one of S720 through S740, the control circuit 80 proceeds to S800.

2-4-1-2. Technical Effects in Fifth Variation

With the sixth drive process, the desired rotational speed and the actual rotational speed of the electric motor 20 decrease from the third rotational speed to the second rotational speed and from the second rotational speed to the first rotational speed in accordance with the difference.

Therefore, in the fifth variation, the time required for the electric motor 20 to actually stop after the driving of the electric motor 20 is stopped can be more reliably reduced.

In the sixth drive process, the desired rotational speed and the actual rotational speed of the electric motor 20 may be varied in four or more steps.

2-4-2. Sixth Variation

The electric-powered lubricator 1 of the sixth variation is different from the electric-powered lubricator 1 of the second embodiment in that a seventh drive process is executed in place of the fifth drive process. The seventh drive process corresponds to the fifth drive process with some partial modifications. Therefore, the following description focuses only on the portions modified from the fifth drive process.

2-4-2-1. Seventh Drive Process

Figure 20:
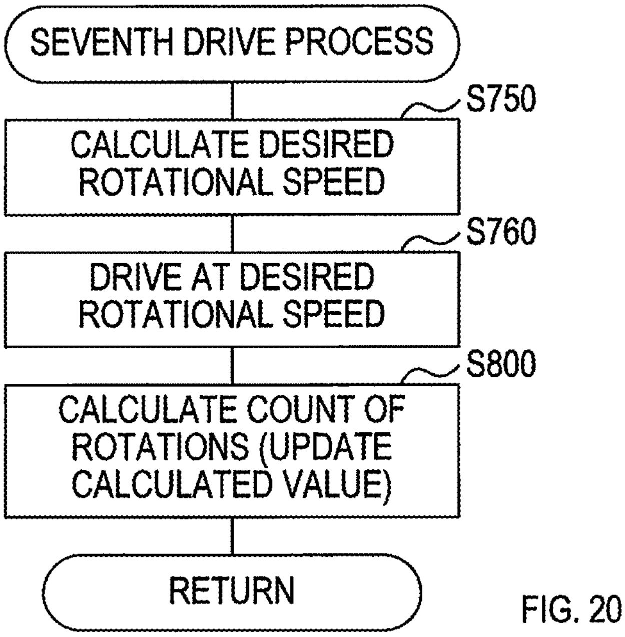
FIG. 20 is a flowchart showing a flow of a seventh drive process.

As shown in FIG. 20, the seventh drive process is different from the fifth drive process in that (i) S710 through S730 are removed and (ii) S750 and S760 are added.

Specifically, in S750, the control circuit 80 calculates the desired rotational speed of the electric motor 20 based on the difference. In the sixth variation, the control circuit 80 calculates the desired rotational speed based on the following equation (2).

$$\text{Desired rotational speed} = \text{difference} \times \text{coefficient} + \text{minimum rotational speed} \quad (2)$$

In the above-described equation (2), the coefficient and the minimum rotational speed are set in advance.

In subsequent S760, the control circuit 80 outputs, to the drive circuit 82, the first through sixth drive control signals for driving the electric motor 20 at the desired rotational speed calculated in S750, and proceeds to S800.

2-4-2-2. Technical Effects in Sixth Variation

In the sixth variation, since the desired rotational speed of the electric motor 20 is set based on the difference, the desired rotational speed is set to the maximum rotational speed corresponding to the converted setting value (i.e. the desired count of rotations) immediately after the start of driving of the electric motor 20. Thereafter, as the calculated value (i.e. the calculated count of rotations) increases and the difference decreases, the desired rotational speed decreases, and thus the actual rotational speed decreases.

In other words, the desired rotational speed and the actual rotational speed continuously decrease in accordance with the difference after the start of driving of the electric motor 20. As a result, the desired rotational speed and the actual rotational speed can be sufficiently decreased when the driving of the electric motor 20 is stopped. Therefore, the sixth variation can also exhibit the same effects as those in the second variation.

2-4-3. Seventh Variation

The electric-powered lubricator 1 of the seventh variation is different from the electric-powered lubricator 1 of the second embodiment in that an eighth drive process is executed in place of the fifth drive process. The eighth drive process corresponds to the fifth drive process with some partial modifications. Therefore, the following description focuses only on the portions modified from the fifth drive process.

2-4-3-1. Eighth Drive Process

Figure 21:
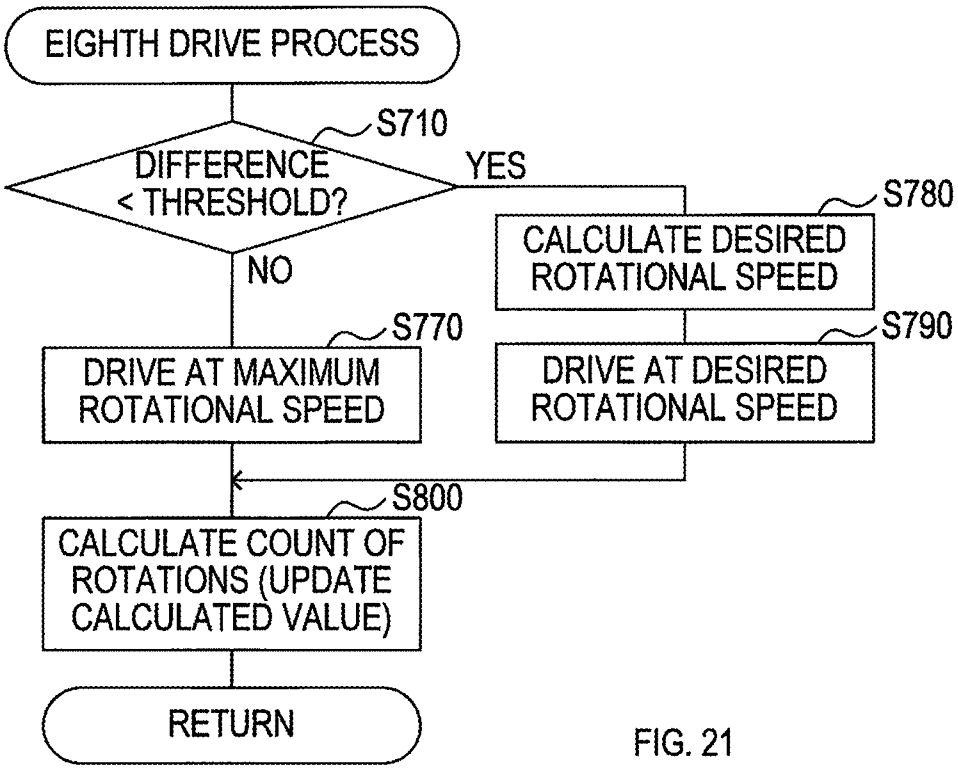
FIG. 21 is a flowchart showing a flow of an eighth drive process.

As shown in FIG. 21, the eighth drive process is different from the fifth drive process in that (i) S720 and S730 are removed and (ii) S770 through S790 are added.

Specifically, when the difference is greater than or equal to the threshold in S710 (S710: NO), the control circuit 80 proceeds to S770. In S770, the control circuit 80 outputs, to the drive circuit 82, the first through sixth drive control signals for driving the electric motor 20 at a preset maximum rotational speed, and proceeds to S800. In the seventh variation, the maximum rotational speed is the rated rotational speed of the electric motor 20, but is not limited to the rated rotational speed.

When the difference is less than the threshold (S710: YES), the control circuit 80 proceeds to S780. In S780, the control circuit 80 calculates the desired rotational speed of the electric motor 20 based on the above-described equation (2), and proceeds to S790.

In S790, the control circuit 80 outputs, to the drive circuit 82, the first through sixth drive control signals for driving the electric motor 20 at the desired rotational speed calculated in S780, and proceeds to S800.

2-4-3-2. Technical Effects in Seventh Variation

In the seventh variation, the electric motor 20 is driven at the preset maximum rotational speed during the interval from when the driving of the electric motor 20 is started until when the difference reaches the threshold at the time point t1. After the time point t1, the desired rotational speed is set in accordance with the difference, and then the desired rotational speed and the actual rotational speed decrease as the difference decreases.

Therefore, the seventh variation can exhibit the same effects as those in the sixth variation. In addition, since the electric motor 20 is driven at the maximum rotational speed during the interval from when the driving of the electric motor 20 is started until when the difference reaches the threshold, the time required for the grease to be dispensed can be reduced as compared with the sixth variation.

2-4-4. Eighth Variation

The electric-powered lubricator 1 of the eighth variation is different from the electric-powered lubricator 1 of the second embodiment in that a fourth control process is executed in place of the third control process. The fourth control process corresponds to the third control process with some partial modifications. Therefore, the following description focuses only on the portions modified from the third control process.

2-4-4-1. Fourth Control Process

Figure 22:
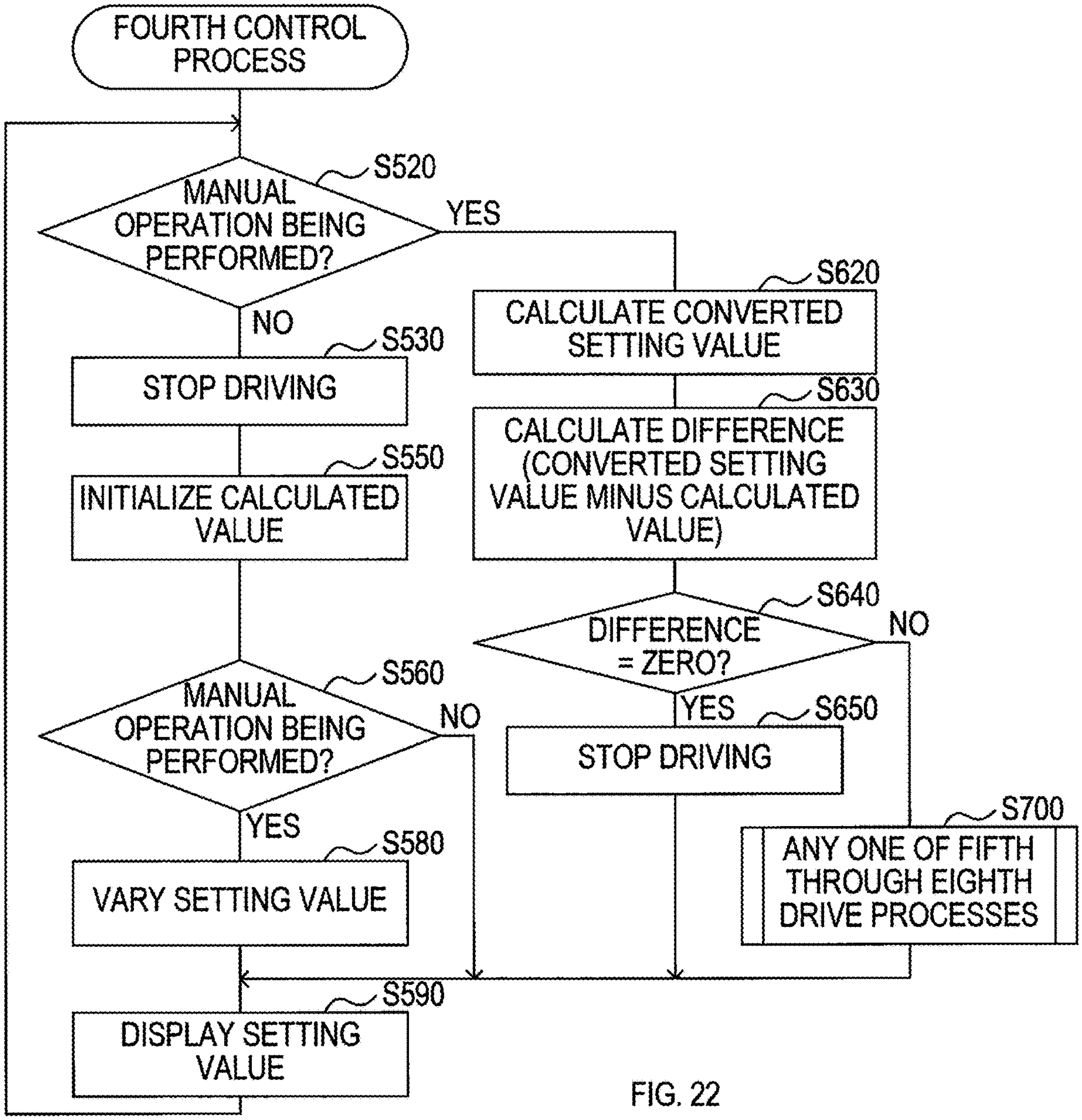
FIG. 22 is a flowchart showing a flow of a fourth control process.

As shown in FIG. 22, the fourth control process is different from the third control process in that (i) S500, S510, S540, S570, S600, and S610 are removed and (ii) S620 through S650 are added.

More specifically, when the trigger switch 8 is not manually operated in S520 (S520: NO), the control circuit 80 does not determine whether the difference is zero in S540, and proceeds to S550 to initialize the calculated value.

Therefore, in the eighth variation, similarly to the fourth variation, when the user temporarily stops the manual operation on the trigger switch 8 and then restarts the manual operation on the trigger switch 8, the user can dispense the grease from the beginning.

In the fourth control process, since the calculated value is initialized when the manual operation on the trigger switch 8 is stopped, the process of S570 in the third control process is not executed.

When the trigger switch 8 is manually operated in S520 (S520: YES), the control circuit 80 proceeds to S620. In S620, the control circuit 80 calculates, based on the setting value and the gear ratio, the converted setting value (i.e. the desired count of rotations).

In subsequent S630, the control circuit 80 calculates the difference between the converted setting value and the calculated value (i.e. the converted setting value minus the calculated value), and proceeds to S640. In S640, the control circuit 80 determines whether the calculated difference is zero. When the difference is zero (S640: YES), the control circuit 80 proceeds to S650. In S650, the control circuit 80 outputs, to the drive circuit 82, the first through sixth drive control signals for stopping driving of the electric motor 20.

When the difference is not zero (S640: NO), the control circuit 80 proceeds to S700 and executes any one of the fifth through eighth drive processes described above. Upon completion of the process of S650 or S700, the control circuit 80 proceeds to S590.

2-5. Further Embodiments

The present disclosure is not limited to the first and second embodiments and the first through eighth variations described above, and can be carried out in various variations.

The actual rotational speed of the electric motor 20 can vary in accordance with the duty ratios of the first through sixth drive control signals. Therefore, in a further embodiment, (i) the duty ratios of the first through sixth drive control signals corresponding to the desired rotational speed may be set or calculated in place of the desired rotational speed and (ii) the duty ratios may be decreased in accordance with the difference. In such an embodiment, the same effects as those in the first and second embodiments and the first through eighth variations can be exhibited.

2-6. Supplementary Explanation

Two or more functions achieved by one element of the above-described embodiments and variations may be achieved by two or more elements. One function achieved by one element may be achieved by two or more elements. Two or more functions achieved by two or more elements may be achieved by one element. One function achieved by two or more elements may be achieved by one element. A part of the configurations in the above-described embodiments and variations may be omitted. At least a part of the configurations in one of the above-described embodiments and variations may be added to or replaced with the configuration in another one of the above-described embodiments and variations.

The present disclosure can be practiced in various modes such as, in addition to an electric-powered lubricator, a system including an electric-powered lubricator, a computer program for causing a computer to function as an electric-powered lubricator, a non-transitory tangible recording medium such as a semiconductor memory in which the computer program is recorded, and a method for dispensing a lubricant from an electric-powered lubricator.

What is claimed is:

1. An electric-powered lubricator comprising:

a first manual switch configured to be manually operated by a user of the electric-powered lubricator;

an electric motor configured to generate a driving force;

a drive circuit configured to drive the electric motor;

a pump including a dispensing port, a chamber, and a plunger, the dispensing port communicating with the chamber, the chamber being configured to accommodate a lubricant therein, the plunger being (i) within the chamber and (ii) configured to reciprocate within the chamber by the driving force of the electric motor so as to dispense the lubricant within the chamber from the dispensing port; and a control circuit configured to perform:

a first operation to control the drive circuit so as to rotate the electric motor at a preset rotational speed in response to the first manual switch being manually operated;

a second operation to calculate a count of reciprocation of the plunger while the electric motor is being driven;

a third operation to control, while the electric motor is being driven, the drive circuit such that the electric motor decelerates from the preset rotational speed in accordance with a difference between (i) a setting value and (ii) a calculated value, the setting value corresponding to a desired count of reciprocation of the plunger, the calculated value corresponding to a calculated count of reciprocation of the plunger; and a fourth operation to control the drive circuit so as to stop driving of the electric motor in response to the calculated value having reached the setting value.

2. The electric-powered lubricator according to claim 1, wherein the control circuit is configured to control the drive circuit such that an actual rotational speed of the electric motor decreases in accordance with a decrease in the difference, in the third operation.

3. The electric-powered lubricator according to claim 1, wherein the control circuit is configured to control the drive circuit such that the electric motor decelerates in a continuous manner or a stepwise manner, in the third operation.

4. The electric-powered lubricator according to claim 1, wherein:

the control circuit is configured to calculate a count of rotations of the electric motor in the second operation;

the calculated value indicates the count of rotations calculated; and the control circuit is configured to convert the setting value into a desired count of rotations of the electric motor and control the drive circuit such that the electric motor decelerates from the preset rotational speed in accordance with the difference between (i) the setting value converted and (ii) the calculated value, in the third operation.

5. The electric-powered lubricator according to claim 1, wherein the control circuit is further configured to perform:

a fifth operation to control the drive circuit so as to stop driving of the electric motor in response to the first manual switch being released from a manual operation performed by the user; and a sixth operation to initialize or hold the calculated value in response to the first manual switch being released from the manual operation.

6. The electric-powered lubricator according to claim 1, wherein the control circuit is configured to control the drive circuit so as to apply a braking force to the electric motor in the fourth operation.

7. The electric-powered lubricator according to claim 1, wherein:

the control circuit is configured to output, to the drive circuit, a pulse width modulated signal to control the drive circuit; and the drive circuit is configured to drive the electric motor in accordance with the pulse width modulated signal.

8. The electric-powered lubricator according to claim 1, further comprising at least one second manual switch (i) distinct from the first manual switch and (ii) configured to be manually operated by the user, wherein the control circuit is further configured to perform a seventh operation to vary the setting value based on the at least one second manual switch being manually operated.

9. The electric-powered lubricator according to claim 1, wherein:

the electric motor has a rated rotational speed; and the preset rotational speed is the rated rotational speed.

10. The electric-powered lubricator according to claim 1, wherein the lubricant is in semisolid form.

11. The electric-powered lubricator according to claim 1, wherein the lubricant includes grease.

12. A method for dispensing a lubricant from an electric-powered lubricator, the method comprising:

driving an electric motor of the electric-powered lubricator at a preset rotational speed based on a manual switch of the electric-powered lubricator being manually operated, the electric motor being configured to reciprocate a plunger of the electric-powered lubricator;

calculating a count of reciprocation of the plunger;

controlling the electric motor such that the electric motor decelerates from the preset rotational speed in accordance with a difference between (i) a setting value and (ii) a calculated value, the setting value corresponding to a desired count of reciprocation of the plunger, the calculated value corresponding to a calculated count of reciprocation of the plunger; and stopping driving of the electric motor based on the calculated value having reached the setting value.

* * * * *